United States Patent
Kieburg et al.

(10) Patent No.: US 9,421,642 B2
(45) Date of Patent: Aug. 23, 2016

(54) DEVICE FOR CUTTING PLASTIC PRODUCTS PROVIDED IN A CONTINUOUS PLASTIC BAND FOR USE IN THE MEDICAL SECTOR

(71) Applicant: B. Braun Melsungen AG, Melsungen (DE)

(72) Inventors: Heinz Kieburg, Berlin (DE); Reiner Franzke, Berlin (DE)

(73) Assignees: B. Braun Melsungen AG, Melsungen (DE); Heinze Kieburg, Berlin (DE)

( * ) Notice: Subject to any disclaimer, the term of this patent is extended or adjusted under 35 U.S.C. 154(b) by 608 days.

(21) Appl. No.: 13/650,295

(22) Filed: Oct. 12, 2012

(65) Prior Publication Data

US 2013/0049265 A1    Feb. 28, 2013

Related U.S. Application Data

(62) Division of application No. 13/583,460, filed as application No. PCT/EP2011/001157 on Mar. 9, 2011, now abandoned.

(30) Foreign Application Priority Data

Mar. 9, 2010  (DE) .......................... 10 2010 011 207

(51) Int. Cl.
*B29C 35/08* (2006.01)
*B23K 26/38* (2014.01)
(Continued)

(52) U.S. Cl.
CPC .............. *B23K 26/38* (2013.01); *B23K 26/402* (2013.01); *A61J 1/065* (2013.01); *A61J 1/067* (2013.01);
(Continued)

(58) Field of Classification Search
CPC .............. B29C 2043/406; B29C 43/40; B29C 47/0066; B29C 2049/5848; B29C 69/005; B29C 66/02241; B29C 66/0246; B29C 66/0326; B29C 69/001; B29C 2793/00; B29C 2793/0009; B29C 2793/0027; B29C 2793/0036; B23K 26/4065; B23K 26/38; B23K 2201/16; A61J 1/065; A61J 1/067; B26D 1/035; B26D 1/045; B26D 1/105; B26D 1/115
USPC ......................................... 264/400, 482, 138
See application file for complete search history.

(56) References Cited

U.S. PATENT DOCUMENTS 4,201,905 A  *  5/1980  Clark ..................... B21D 28/12
                                                     219/121.6
4,328,411 A      5/1982  Haller et al.
(Continued)

FOREIGN PATENT DOCUMENTS

CN    101318365    12/2008
CN    101553354    10/2009
(Continued)

OTHER PUBLICATIONS

Office Action for U.S. Appl. No. 13/583,460 mailed Sep. 24, 2013.
(Continued)

*Primary Examiner* — Seyed Masoud Malekzadeh
(74) *Attorney, Agent, or Firm* — RatnerPrestia

(57) ABSTRACT

Devices for cutting interconnected plastic products for use in the medical sector provided in a continuous band of plastic, comprising a laser, a laser control system and an optical acquisition and data processing unit are disclosed. Devices for the manufacture of plastic products, such as finable or filled plastic containers for use in the medical sector, comprising a device for cutting interconnected plastic products provided in a continuous band of plastic as well as a process for cutting interconnected plastic products provided in a continuous band of plastic are disclosed. The optical acquisition unit may determine positional data for the interconnected plastic products provided in the band. From the positional data a cutting pattern may be calculated and transmitted to the laser control system. According to this cutting pattern, the position, intensity and focal point of the laser may be controlled by the laser control system, which may comprise a focusing optic, a deflection means and a beam-forming means.

10 Claims, 2 Drawing Sheets

(51) Int. Cl.
| | |
|---|---|
| B29C 69/00 | (2006.01) |
| B29C 65/00 | (2006.01) |
| B29C 43/40 | (2006.01) |
| B26D 1/04 | (2006.01) |
| B26D 1/11 | (2006.01) |
| B29C 49/58 | (2006.01) |
| B23K 26/40 | (2014.01) |
| B26D 1/10 | (2006.01) |
| B29C 47/00 | (2006.01) |
| B26D 1/03 | (2006.01) |
| A61J 1/06 | (2006.01) |

(52) U.S. Cl.
CPC ......... *B23K 26/4065* (2013.01); *B23K 2201/16* (2013.01); *B23K 2203/42* (2015.10); *B26D 1/035* (2013.01); *B26D 1/045* (2013.01); *B26D 1/105* (2013.01); *B26D 1/115* (2013.01); *B29C 43/40* (2013.01); *B29C 47/0066* (2013.01); *B29C 66/0246* (2013.01); *B29C 66/02241* (2013.01); *B29C 66/0326* (2013.01); *B29C 69/001* (2013.01); *B29C 69/005* (2013.01); *B29C 2043/406* (2013.01); *B29C 2049/5848* (2013.01); *B29C 2793/00* (2013.01); *B29C 2793/0009* (2013.01); *B29C 2793/0027* (2013.01); *B29C 2793/0036* (2013.01)

(56) References Cited

U.S. PATENT DOCUMENTS

| | | | | |
|---|---|---|---|---|
| RE31,042 | E | * 9/1982 | Clark | B21D 28/12 219/121.6 |
| 4,682,003 | A | 7/1987 | Minakawa | |
| 4,758,398 | A | * 7/1988 | Sparapany et al. | 264/151 |
| 5,221,823 | A | 6/1993 | Usui | |
| 5,231,262 | A | * 7/1993 | Matsumura et al. | 219/121.67 |
| 5,351,464 | A | * 10/1994 | Francioni | 53/450 |
| 5,695,789 | A | * 12/1997 | Harris | 425/131.1 |
| 5,731,566 | A | 3/1998 | Steinhart | |
| 5,744,776 | A | 4/1998 | Bauer | |
| 5,825,801 | A | 10/1998 | Nishida et al. | |
| 6,492,617 | B2 | 12/2002 | Nagahori et al. | |
| 6,508,972 | B1 | * 1/2003 | Lietz | 264/407 |
| 6,600,128 | B2 | 7/2003 | Lai | |
| 6,807,797 | B2 | 10/2004 | Forsberg | |
| 6,888,098 | B1 | 5/2005 | Merdan | |
| 7,344,671 | B2 | * 3/2008 | Basque et al. | 264/400 |
| 7,396,225 | B2 | 7/2008 | Hansen | |
| 7,651,264 | B2 | 1/2010 | Matsumoto et al. | |
| 7,871,480 | B1 | * 1/2011 | Toney | 156/73.1 |
| 8,047,033 | B2 | 11/2011 | Kondo | |
| 8,404,175 | B2 | 3/2013 | Humele | |
| 8,816,244 | B2 | 8/2014 | Merdan | |
| 2001/0029365 | A1 | 10/2001 | Nagahori et al. | |
| 2003/0103880 | A1 | 6/2003 | Bunk | |
| 2003/0106880 | A1 | 6/2003 | Lai | |
| 2003/0222971 | A1 | * 12/2003 | Kusano | 347/262 |
| 2004/0195719 | A1 | 10/2004 | Ishii et al. | |
| 2005/0187651 | A1 | 8/2005 | Kimura | |
| 2005/0252893 | A1 | 11/2005 | Shapovalov | |
| 2007/0284785 | A1 | 12/2007 | Hoekstra | |
| 2008/0190903 | A1 | 8/2008 | Klotzbach | |
| 2009/0028038 | A1 | * 1/2009 | Harada | 369/173 |
| 2009/0084766 | A1 | 4/2009 | Moritz et al. | |
| 2010/0089008 | A1 | 4/2010 | Parini | |
| 2010/0139468 | A1 | 6/2010 | Hansen | |
| 2010/0140233 | A1 | 6/2010 | Matsumoto et al. | |
| 2010/0307309 | A1 | 12/2010 | Hansen | |
| 2010/0314029 | A1 | * 12/2010 | Lindgren et al. | 156/98 |
| 2011/0060444 | A1 | 3/2011 | Becker et al. | |

FOREIGN PATENT DOCUMENTS

| | | |
|---|---|---|
| DE | 4444547 | 6/1996 |
| DE | 10148759 | 4/2002 |
| DE | 102004049017 | 4/2006 |
| DE | 102005035495 | 2/2007 |
| DE | 102007039878 | 5/2008 |
| DE | 102007046142 | 4/2009 |
| DE | 102008034511 | 1/2010 |
| EP | 1 321 839 | 6/2003 |
| EP | 1447068 | 8/2004 |
| EP | 1626903 | 2/2006 |
| EP | 2 042 259 | 4/2009 |
| JP | 1249056 | 10/1989 |
| JP | 03294077 A * | 12/1991 |
| JP | 2844827 | 10/1998 |
| JP | 2005040843 | 2/2005 |
| JP | 2005230886 | 9/2005 |
| JP | 2006191139 | 7/2006 |
| JP | 2007532239 | 11/2007 |
| JP | 2009530189 | 8/2009 |
| KR | 1020040061029 | 7/2004 |
| KR | 1020090027319 | 3/2009 |
| RU | 2026787 | 1/1995 |
| RU | 23402 | 6/2002 |
| RU | 2197279 | 1/2003 |
| RU | 63740 | 11/2006 |
| SU | 41966 | 2/1935 |
| SU | 287775 | 1/1976 |
| WO | WO 2005/037675 | 4/2005 |
| WO | 2005072905 | 8/2005 |
| WO | 2005102590 | 11/2005 |
| WO | 2007105953 | 9/2007 |
| WO | WO 2007/105079 | 9/2007 |
| WO | WO 2009 030311 | 3/2009 |
| WO | WO 2009/106219 | 9/2009 |

OTHER PUBLICATIONS

International Search Report for PCT/EP2011/001157 mailed Jul. 16, 2012.

* cited by examiner

DEVICE FOR CUTTING PLASTIC PRODUCTS PROVIDED IN A CONTINUOUS PLASTIC BAND FOR USE IN THE MEDICAL SECTOR

CROSS REFERENCE TO RELATED APPLICATIONS

This application is a divisional of U.S. Ser. No. 13/583,460 filed Sep. 7, 2012, now is abandoned, which was the U.S. national phase application of PCT International Application No. PCT/EP2011/001157 filed Mar. 9, 2011, which claims priority to German Patent Application No. DE 10 2010 011 207.0 filed Mar. 9, 2010, the contents of these applications being incorporated by reference herein.

FIELD OF THE INVENTION

The present invention is directed to a device for cutting plastic products provided in a continuous plastic band wherein the single plastic products are connected to each other for use in the medical sector, comprising at least one laser, at least one laser control system, at least one optical acquisition and data processing unit, and a quality control device with an integrated pressure sensor for the detection of incorrect or not sufficient laser cuts. Furthermore, the present invention is directed to a machine for the production of plastic products, especially the production of filled or fillable plastic products for use in the medical sector, comprising the device for cutting plastic products provided in a continuous plastic band connected to each other. Also disclosed is a method to cut the plastic products in the continuous plastic band wherein the single plastic products are connected to each other.

DESCRIPTION OF THE RELATED ART

It is known that lasers can be used e.g. to cut, weld or engrave. Different approaches have been pursued in the prior art. The patent application DE 102007046142 A1 describes a device with an electronically controllable robot with a laser cutting head that can be moved to predetermined reference positions. Another method for engraving with a laser is described in DE 10148759 A1. In this method the laser is focused on the substrate, and the substrate is moved in the x-y axis. Another method for welding is described in the patent DE 102005035495 B4.

The U.S. Pat. No. 5,231,262 A application discloses a laser cutting device, comprising a laser, a position detection system, an image processor and a laser control system in form of mirrors, light-shutters, objective lens and a rotating arm. The U.S. Pat. No. 4,328,411 A application describes a method to cut amorphous metal through crystallization with a laser. Also disclosed is a punching machine in combination with a pressing mould, which punches the pre-cut form out of the amorphous metal.

SUMMARY OF THE INVENTION

The object of at least one aspect of the present invention is to provide a device, which further improves the prior art and allows an increased efficiency when cutting plastic products provided in a continuous band for use in the medical sector.

DETAILED DESCRIPTION OF THE PREFERRED EMBODIMENTS

Further preferred embodiments result from the depending claims, the examples, the figures and the description.

Surprisingly it was found that a device, comprising at least one laser, at least one laser control system, at least one optical acquisition and data processing unit, and a quality control device with an integrated pressure sensor for the detection of incorrect laser cuts has an increased efficiency when cutting plastic products provided in a continuous band wherein the single plastic products are connected to each other for use in the medical sector.

The functional principle of the inventive device is as follows: An optical acquisition unit determines positional data of the plastic products provided in the continuous band and connected to each other. The positional data are used to calculate a cutting pattern, which is transmitted to the laser control system. In accordance to the cutting pattern, the position, intensity and focal point of the at least one laser beam is controlled through a focusing optic and a deflection means.

According to the present invention gas lasers, solid-state lasers and/or dye lasers can be used. The lasers belonging to the group of gas lasers comprise excimer laser, noble gas ion laser, metal vapor laser or molecular gas laser.

The group of excimer lasers includes but is not restricted to $H_2$-laser (116/123 nm), $Ar_2$-laser (126 nm), $F_2$-laser (157 nm), $Xe_2$-laser (172 nm), ArF-laser (193 nm), KrF-laser (248 nm), XeBr-laser (282 nm), XeCl-laser (308 nm) and XeF-laser (351 nm). Noble gas ion lasers include but are not restricted to $(Ar)^+$-laser (including ~460 nm, 480 nm, 500 nm, 520 nm), $(Kr)^+$-laser (650 nm) and He—Cd-laser (325 nm, 440 nm).

The group of metal vapor lasers includes but is not restricted to Cu-laser (500 nm, 545 nm) and Au-laser (310 nm, 605 nm). The group of molecular gas lasers comprises CO-laser (6-8 µm), $CO_2$-laser (9 µm, 10.6 µm, 11 µm) and $N_2$-laser (337 nm).

Solid-state lasers can be selected from ruby $Cr^{3+}:Al_2O_3$-laser (694 nm), Neodymium glass (Nd:Glass) laser (1062 nm), Neodymium-YAG-laser (1064 nm), Alexandrite-laser (755 nm), ALGaN/GaN-laser (400-500 nm), InGaAs/GaAs-laser (700-880 nm), InGaAsP/InP-laser (900-1100 nm) and Pb-Chalkogenide-laser (2, 6-30 µm). The group of dye lasers comprises amongst others stilbenes, coumarins and rhodamines covering the whole spectrum from ~300 nm to 1300 nm.

In further embodiments the cutting process can be performed parallel, synchronous or consecutively by multiple lasers. Preferably the cutting process is performed by two lasers, more preferably by three lasers and most preferably by four lasers. There is no limit to the number of lasers. The number of lasers can be adapted and depends on the complexity of the cutting pattern and the size and dimension of the plastic products provided in the continuous band. It is also possible to split the laser beam with a beam splitter into multiple beams and control each beam independently from each other for the cutting process. Preferred are $CO_2$-laser and UV-laser. In particular preferred are $CO_2$-laser with a wave length of 9.4 µm, more preferably with 10.3 µm or 10.6 µm with a preferred output power of 200 W or between 180 W and 220 W respectively. Preferred UV-laser comprise solid-state lasers on the basis of Nd:YAG, YLF or Nd:VO4, where by means of frequency conversion with nonlinear crystals, the third harmonic with a wavelength of 355 nm or in the vicinity thereof is generated. These lasers enable an extremely fine focusing of the laser beam, which is suited to cut or separate or perforate the narrow connections between the plastic components completely or partially.

According to the present invention, a focused laser beam is guided around the contours of the plastic products provided in the continuous band to melt or evaporate the material between the products and/or the continuous band. The Gaussian intensity distribution of the laser beam cross-section ensures that the laser radiation melts the material at the edges and no burr formation occurs. This has the advantage that at the edge of the plastic products no sharp edges form that may damage e.g. sterile gloves used in the medical field or even lead to cuts to the hand of the person working with the cut plastic products. The separation with a laser beam has distinct advantages over mechanical separation devices like e.g. punching devices, because the use of mechanical devices leads inherently to the formation of burrs or sharp edges. The sharpness of the resulting burr and/or the cutting edge is directly dependent form the hardness/rigidity of the plastic material.

The plastics are preferably selected from the group consisting of polyamides, polyolefins or copolymers, as well as combinations of such plastics or copolymers in the form of composite materials. Preferably the plastic is polyethylene (PE), even more preferred is polypropylene (PP) or any other plastic with at least the hardness/rigidity, tensile strength, torsion module, Young's modulus and/or melting range of polypropylene (PP). Any plastic, that is at least as rigid or hard or even more rigid or harder as PP can be cut preferably according to the present invention.

Further plastics that can be used with the inventive device can be selected from the group consisting of or comprising: polyvalerolactones, poly-ε-decalactones, polylactonic acid, polyglycolic acid, polylactides, polyglycolides, copolymers of the polylactides and polyglycolides, poly-ε-caprolactone, polyhydroxybutanoic acid, polyhydroxybutyrates, polyhydroxyvalerates, polyhydroxybutyrate-co-valerates, poly(1,4-dioxane-2,3-diones), poly(1,3-dioxane-2-ones), poly-p-dioxanones, polyanhydrides such as polymaleic anhydrides, polyhydroxymethacrylates, fibrin, polycyanoacrylates, polycaprolactonedimethylacrylates, poly-b-maleic acid, polycaprolactonebutyl-acrylates, multiblock polymers such as from oligocaprolactondioles and oligodioxanondioles, polyether ester multiblock polymers such as PEG and polybuty-lenetereph talate, polypivotolactones, polyglycolic acid trimethyl-carbonates, polycaprolactone-glycolides, poly-g-ethylglutamate, poly(DTH-iminocarbonate), poly(DTE-co-DT-carbonate), poly(bisphenol-A-iminocarbonate), polyorthoesters, polyglycolic acid trimethyl-carbonates, polytrimethylcarbonates, polyiminocarbonates, poly(N-vinyl)-pyrrolidone, polyvinylalcoholes, polyesteramides, glycolated polyesters, polyphosphoesters, polyphosphazenes, poly[p-carboxyphenoxy)propane], polyhydroxypentanoic acid, polyanhydrides, polyethyleneoxide-propyleneoxide, polyurethanes, polyether esters such as polyethyleneoxide, polyalkeneoxalates, polyorthoesters as well as copolymers thereof, carrageenanes, collagen, polyhydroxyalkanoates, pectic acid, actinic acid, carboxymethylsulphate, collagen, collagen-N-hydroxysuccinimide, polyacrylic acid, polyacrylates, polymethylmethacrylate, polybutylmethacrylate, polyacrylamide, polyacrylonitrile, polyamides, polyetheramide, polyethylene amine, polyimides, polycarbonates, polycarbourethane, polyvinyl ketones, polyvinyl halides, polyvinylidene halides, polyvinyl ethers, polyvinyl aromatics, polyvinyl esters, polyvinylpyrrolidone, polyoxymethylene, polybutylene, polytetrafluoroethylene, polyolefin elastomers, polyisobutylene, EPDM Rubber, Fluorosilicone, carboxymethylchitosan, polyethylene terephthalate, Polyvalerate, ethyl vinyl acetate copolymers, polysulfones, polyethersulfones, epoxy resins, ABS resins, silicones such as polysiloxanes, Polyvinylhalogene and copolymers and/or mixtures of the aforementioned polymers as well as laminates and multi-layer systems of the aforementioned polymers.

Plastic products made of polypropylene have the great advantage over plastic products made of polyethylene that they can be autoclaved and sterilized at or above temperatures of 121° C. This is of particular importance in the medical sector, where it is essential to ensure that all germs are killed. Because of the higher temperatures necessary to process polypropylene the plastic products have to be cooled down over a longer distance and/or a longer time before it is possible to cut the plastic products out of the continuous plastic band wherein the single plastic products are connected to each other. Moreover, PP is much harder than PE and mechanical cutting or punching leads naturally to even more sharp burrs and/or cutting edges.

With the inventive device it is possible to cut plastics with a high processing temperature directly after processing. It is not necessary to wait for the plastics to cool down nor is it needed to install long conveyer bands to cool the plastic products during transportation down to a temperature at which it is possible to cut the plastic products. Consequently, it is also preferred to cut plastics that have a high Young's modulus and thus tend to form sharp burrs and/or edges when cut or punched mechanically. Especially preferred is polypropylene, which is regularly specified with a melting range between 160° C. and 170° C. and a Young's modulus of about 1520 N/mm$^2$. Thus, such plastics are preferred which have a melting range above 160° C., more preferred above 180° C., further preferred above 200° C. and especially preferred above 220° C. and can be routinely autoclaved at or above temperatures of 121° C. without getting deformed. Furthermore, such plastics are preferred which have an operating temperature above 100° C., more preferred above 110° C. and/or with a Young's modulus above 1500 N/mm$^2$, more preferred above 1700 N/mm$^2$ and further preferred above 1900 N/mm$^2$. An especially preferred plastic that can be cut with the inventive device is polypropylene and any other plastics, characterised by a melting range, tensile strength, torsion module or hardness/rigidity in the range of polypropylene, wherein "in the range" of is defined as ±10% to the corresponding value of polypropylene, i.e. a value of −10% to +10% of polypropylene.

The inventive device uses a laser to cut the plastic products provided in the continuous band of plastic. A cooling line for the hot plastic products is not necessary, because the laser can cut the hot material or the hot material in the process of cooling down respectively, safely and precisely. This is especially advantageous, when cutting plastic products for the medical sector at elevated temperatures directly or shortly after the plastic products leave the molding roll, when they already start to harden. Additionally, it is possible to perforate the narrow connections between the plastic components completely or partially or to induce predetermined breaking points making it easier to separate the plastic products from each other. This is especially advantageous when the plastic products are made of polypropylene, which is extremely tenacious after cooling down making it difficult to separate the plastic products manually without any further mechanical aid e.g. a scissor.

Therefore, the inventive laser cutting device is especially useful for cutting warm or hot polymers and plastics, i.e. cutting polymers or plastics with a temperature of at least 60° C., preferred at least 80° C., further preferred at least 100° C., more preferred at least 115° C., more preferred at least 125° C., even more preferred at least 135° C., further preferred 145° C. and more preferred at least 155° C., whereby plastics and/or polymers can be cut even at temperatures from 200° C. to 250° C. Furthermore, the device according to the invention is preferably used to cut plastic products that are in the process of cooling or heating, wherein the temperature of the segment to be cut is different at the beginning of the cutting process in comparison to the temperature at the end of the cutting process. The word "segment" is to be understood as the section for example in a continuous belt that is recognized in a work cycle by the optical acquisition unit and were the cutting pattern is defined. The laser cutting is very accurate even when a temperature gradient exists, i.e. temperature changes during cutting in the plastic product or the plastic segment respectively. The inventive device acquires and processes the cutting pattern for the plastic products correctly in a temperature range from −100° C. to +300° C. Any changes in the temperature of the plastic up to 1° C. per second can be acquired and processed by the inventive device. This includes also changes in consecutive cutting patterns and cutting modes as well as for changing plastic materials during the cutting of a cutting pattern or for consecutive segments and cutting patterns.

The term "cutting" or "laser cutting" as used herein shall be understood as cutting through plastic material with a laser beam, preferably polypropylene and similar polymers or polyethylene, this also includes perforating, i.e. alternating parts of cut through and uncut parts as well as cutting partially through or thinning parts, in the meaning that the material at the cutting point is not completely cut through but only the thickness is reduced, i.e. the material bonding still exists, but can be separated mechanically with less force. Thus, the term "cutting" or "laser cutting" describes cutting completely through the plastic material along the whole cutting pattern or only at specific points of the cutting pattern as well as perforating the plastic material along the whole cutting pattern or only at specific points of the cutting pattern, i.e. completely cut through parts alternate with uncut parts.

The term "cutting pattern" is to be understood as the totality of all parts to be cut, which are acquired by the optical acquisition unit in one detection step. The cutting pattern can be positioned in a segment of a continuous band of interconnected plastic products. Thus, if it is intended to cut plastic products in a continuous band or belt of interconnected plastic products, the optical acquisition unit gradually acquires a part (i.e. segment) of the continuous band or belt of interconnected plastic products, which is fed to the inventive device and then is cut according to the cutting pattern. The cutting pattern comprises the plastic products, acquired through the optical acquisition unit, which are usually three-dimensional and lie above and below the plane level and are defined through the continuous band or the continuous belt, which can comprise further user definable and thus predefined information concerning the cutting mode. The optical acquisition unit can detect for example, where the cutting is to be performed. The mode of cutting (completely, partially, perforating, etc.) can be predetermined by the user. Alternatively or additionally the optical acquisition unit can detect respective markings, which do not only give information where the cuts are to be made but also the mode of cutting can be included as information. Naturally a combination of the aforementioned is possible, thus a mix of predefined patterns and automatic detection of the cutting mode and/or cutting pattern is possible. Instead of a continuous band or a continuous belt it is also possible that single units or only parts of the continuous band, i.e. isolated segments, are detected by the optical acquisition unit.

The cutting pattern and eventually the cutting mode is determined anew by the optical acquisition unit before cutting a specific section, or specific part of the continuous band or the continuous belt, thus it is possible to handle various cutting patterns and cutting modes in random order. This is a distinct advantage over mechanical cutting and/or punching processes. The mechanical punching or mechanical cutting tool are determined for a defined cutting pattern or defined cutting mode and cannot adapt to changes in alternating segments with different cutting patterns and cutting modes. The inventive laser cutting device can handle up to ten different cutting patterns with different cutting modes, which is impossible to achieve with a mechanical cutting or punching tool. Even if different punching or cutting tools are used, there are still only a limited number of patterns that can be handled. The inventive device is independent of the exact cutting pattern, i.e. is not restricted to a specific pattern but can detect and handle any cutting pattern.

The cutting pattern is determined through suitable markings, which are detected by the optical acquisition unit. This can include colored markings, spatial markings as well as radioactive markings.

Colored markings include for example, colored markings in the visible range, infrared range or UV range and can be incorporated or attached to the plastic. This extends also to other materials which can be incorporated or attached to the plastic and are distinguishable from the plastic material such as thin filaments, wires or micro particles. Spatial markings on the other hand can be realized as elavations, dents or holes in the plastic material. Radioactive markers are radioactive substances incorporated or attached to the plastic material, wherein a radioactively labeled substance or solution in the plastic product may serve as a marker.

The data processing unit determines which parts of the cutting pattern are to be cut by the laser completely, or are only perforated, thinned and/or are not to be processed. Thus, the laser is capable of cutting specific parts completely, perforate them, reduce the thickness of the material to a specific degree and/or ignore specific parts, all within the limits of the detected and/or predetermined cutting pattern by the optical acquisition unit, depending on which mode of cutting was predefined by the user or a marking in the cutting pattern or a segment respectively. The laser is under the control of the data processing unit and is guided according to the cutting pattern detected by the optical acquisition unit and the predefined cutting mode.

The use of the laser beam for accurate cutting of the plastic products is dependent from the optical acquisition unit, which determines positional data of the interconnected plastic products provided in the continuous plastic band. The positional data can comprise information about the forms, sizes, shapes, geometric forms, laser markings, shadow projection, color recognition, light/dark zones or reflections which are detected by the optical acquisition unit.

In a preferred embodiment the optical acquisition unit comprises a camera. In another preferred embodiment a laser scanner is used together with a detector to determine positional data by measuring the interconnected plastic products provided in the continuous plastic band. The laser can be diverted by a mirror system to depict a complete surface profile of the plastic products.

The positional data are transmitted to a data processing unit, e.g. a programmable micro processor, where they are further processed. The term "processed" is to be understood in the way that the actual determined positional data is compared with positional data stored in the data processing unit. For each combination of positional data a cutting pattern is stored in the data processing unit, which is transmitted to the laser control system to control the laser.

This has the advantage that a precise dimensional accuracy of the plastic products provided in the belt is not required, because the optical acquisition unit detects the respective actual state of the plastic products. Particularly for the manufacture of plastic products usually high temperatures are used. The resulting temperature-dependent expansion and/or shrinking of the plastic has made an e.g. mechanical punching only possible at fixed lower temperatures. The use of the inventive device eliminates this problem and the plastic products can be cut accurately at different temperatures. Moreover, it follows that when cutting various different plastic products, a complicated conversion of the device is not necessary, because only the cutting patterns must be changed for the positional data.

In another preferred embodiment the positional data are not compared with the stored positional data, but the data processing unit calculates the respective cutting pattern from the acquired positional data and transmits the calculated cutting pattern to the laser control system to control the laser.

In a further preferred embodiment positional data as well as cutting patterns are stored, which are corrected by the respective actual positional data, leading to an adapted cutting pattern which is transmitted to the laser control system to control the laser.

The laser control system consists preferably of a controllable focusing optic, a controllable deflection means and a beam-forming means. In this context the term "controllable" is to be understood that the focusing optic and the deflection means can be controlled with the cutting patterns calculated by the data processing unit and further that the data are transmitted in a suitable format. The beam-forming means collimates the laser beam and reduces the divergence of the beam for the purpose of a better focusing. In accordance with the determined positional data, the position of the focus and intensity of the focal point of the at least one laser is controlled by a controllable focusing optic and a controllable deflection means. If more than one laser is used preferably each laser is controlled by another laser control system.

In an embodiment the laser control system comprises a beam-forming means, which collimates the laser beam, a telescopic lens system, which reduces the divergence of the beam for the purpose of a better focusing, a mirror deflection system, which guides the laser beam in two- or three-dimensions around the interconnected plastic products according to the predetermined cutting pattern, a focusing optic, which focuses the laser beam such that the plastic material is evaporated during the movement of the laser beam and a software-controlled electronics, which converts the data for the cutting pattern in mirror movements.

In a preferred embodiment, the controllable deflection means is a galvanometer scanner, deflecting the direction of the laser beam with mirrors. In more preferred embodiments, the galvanometer scanner deflects the laser beam over two or more mirrors. Depending on the geometric properties of the plastic products one or more controllable deflections means can be used. In a preferred embodiment, no relative movement takes place between the plastic product and the laser optics, i.e. the laser optics is fixed and immovable, and the laser beam is controlled only by the controllable deflection means.

In another embodiment the laser beam is not deflected by a controllable deflection means, but the laser optics or a part of the laser optics is moved relative to the plastic product to perform the cutting process. The term laser optics comprises all the components necessary for forming, focusing, controlling or amplifying the laser beam. For example, only the lens and the mirror system can be moved, or only the lens, or only the mirror system or the entire laser optics relative to the plastic product.

In a particularly preferred embodiment the laser beam is controlled by a movable controllable deflection means. The term movable in this context means that the controllable deflection means can be moved in the x, y and z axis. This ensures that the laser beam can also reach and cut areas which are difficult to access.

A further advantage is that the controllable deflection means can also be used to simultaneously label the ampoules, thus cutting and labeling is done in one work process.

The focusing optic is preferably a lens or a mirror, more preferably a convex lens or a focusing concave mirror. The concave mirror provides the further advantage that each laser wavelength can be focused on the same point without having to use special optical materials.

In one embodiment, the device comprises a conveying unit for the interconnected plastic products provided in the continuous band. This conveying unit consists preferably of a feeding-in device that pulls the interconnected plastic products provided in the continuous band under the laser and the optical acquisition unit. This allows a high throughput and a full automatic cutting of the plastic products provided in the continuous band.

In other embodiments the conveying unit is a conveyor belt on which the interconnected plastic products are transported.

One of the significant advantages of laser separation of plastic products, e.g. ampoules, bags or other cavities is to create a fused edge as opposed to a sharp ridge after mechanical separation. This is especially important when cutting plastic products for use in the medical sector because a sharp ridge may cause damage to sterile gloves or may even injure the hand of the doctor or of the hospital staff when using such ampoules. Mechanically cut plastic products have always sharp ridges due to the fact that at the side where the cutting blade leaves the cut line a sharp ridge will occur.

The conventional laser cutting process with a fixed beam and focusing through a nozzle for processing gas may also lead to burrs on the edges. It is better to cut the ampoules with a movable beam, e.g. with a galvo scanner, because this method can be carried out more precisely by fine tuning of laser parameters and beam-forming elements, such as telescopes and lenses and scanner movements so that the edges are fused at the joints. To achieve this, a sensor and a control system are required as provided in the present invention.

However, even with this kind of separation it is possible that the cut plastic products, e.g. ampoules, are not separated with fused edges. This is the case when a barely perceptible sharp ridge holds the ampoules together. When the ampoules are then finally separated, the sharp ridges still remain. Such sharp ridges can be the result of slight power fluctuation of the laser or a barely detectable variation in the beam direction.

Since the ampoules are provided within a pack of ampoules with very narrow connections, the quality of the laser cut can usually only be evaluated with a very complex image recognition system and special cameras. Such a system slows down the whole manufacturing process, is inherently expensive and prone to malfunctions and cannot easily be integrated in existing systems.

Consequently, the inventive device further comprises a quality control device with an integrated pressure sensor for pressing out the cut plastic products. The interconnected plastic products provided in the continuous plastic band are preferably not separated completely by the laser from the residual material, i.e. the framework, so that the cut plastic products can be transported within the surrounding material until the final separation takes place. During the laser cutting, precisely defined narrow connections are left between the plastic products and the surrounding residual material. For the final separation step the plastic products are transported under the quality control device with an integrated pressure sensor. A stamp with the form of the ampoule pack or a stamp with a certain number of pins which hit predefined locations of the single plastic product or of a section of the continuous plastic band, i.e. an adapted stamp, presses the plastic products and especially the material between the toggle parts of the ampoules, i.e. the material between the neck regions of neighboring ampoules, out of the residual surrounding material. If the pressure or force necessary to push the ampoules out of the surrounding material and/or the material between the toggle regions exceeds a predefined first adjustable value, this is an indication that the plastic products are not sufficiently separated and are still connected with the surrounding material, i.e. are still connected to the belt or to each other.

Instead of a stamp which actually hits the plastic products or units or bundles of plastic products in order to separate them, a gas blow such as an air blow or multiple gas blows generated by one or a plurality of nozzles can be used to put a kind of gas blow pressure on the plastic products or units or bundles of plastic products. Thereby the single gas blows are generated with a defined pressure which again indicates the quality of the laser cut by determining if the gas blow or the gas blows were sufficient to separate the single plastic products or units or bundles of plastic products. Instead of a gas the skilled person may also use a liquid such as water for the same purpose.

Thus, the quality control device with an integrated pressure sensor is directed to pressing the laser cut plastic products out of the surrounding residual material of the continuous band thereby generating single plastic products or units of plastic products which are still attached to each other but already perforated preferably by the laser used in the cutting device so that the separation can be done easily without forming sharp ridges. This is usually performed with an adapted mould having the form of the ampoule or ampoule packs. Additionally, narrow stamps can be included that push out the residual material between the toggle parts, i.e. the area between the neck regions of two adjacent ampoules. If a predefined first adjustable value is exceeded, then the laser cutting was not sufficient and the plastic products are collected separately. This has the advantage that insufficiently cut plastic products can be separately collected from the correctly cut plastic products and then proceeded later again and thus are not lost as waste. Thus in one embodiment the quality control device with an integrated pressure sensor consists of a mould adapted to the form of the ampoules, which presses the plastic products precisely out of the surrounding residual material.

Furthermore, the quality control device with an integrated pressure sensor can control the quality of the laser cut, i.e. the quality of the intended separation, by measuring the resistance and/or force that is necessary to press the plastic products out of the surrounding residual material. The pressure/force necessary to push the ampoules out of the surrounding material and/or the toggle parts of the ampoules, i.e. the material between the neck regions of neighboring ampoules, gives direct information on whether the laser cut did successfully melt the material at the edges so that no sharp burr formation has occurred.

The applicant has found when laser cutting, for instance, polypropylene ampoules that the following applies:

- If the pressure sensor does not register any resistance, the ampoules are separated correctly and the edges are completely fused around the ampoules
- If the pressure sensor registers a resistance up to 0.5 N to push the ampoules out of the surrounding residual material, then only a negligible ridge has formed and the use of the ampoule is safe.
- If the pressure sensor registers a resistance over 0.5 N to push the ampoules out of the surrounding residual material, then a significant sharp ridge has formed and the ampoules are possibly harmless and will be sorted out.

Thus, if the required pressure necessary to push the plastic products such as bags, bottles, cylinders, ampoules or other cavities out of the surrounding material and/or the toggle parts of the ampoules, i.e. the material between the neck regions of neighboring ampoules exceeds a second threshold but is still under the first threshold, this gives an indication that the laser cut is unsatisfactory and potentially harmful formation of sharp ridges or burrs in the plastic product has occurred.

In a further embodiment, the quality control is performed at the material between the toggle parts, i.e. the area between the neck regions of two adjacent ampoules.

Thus, the force required to push the plastic products out of the surrounding residual material provides information on whether the plastic product was cut correctly, i.e. the plastic products can be pushed out of the surrounding material or not. Furthermore, the required force indicates, whether the ridges are safe or if any sharp ridges have formed that may be potentially harmful.

Having described the inventive quality control device with an integrated pressure sensor it is clear to the skilled artisan that the exact first and second values or thresholds for the pressure/force depend on factors such as the kind of plastic to be cut, the thickness of the material, the temperature at which the cut is performed, the output power for the lasers and/or the geometry or size of the plastic products and the like. It is within the scope of the skilled artisan to determine through minimal experimentation, which pressure or force threshold is indicative for the plastic products in the continuous band. Thus, it is not complicated and even not inventive to find the right pressure range which indicates for the given plastic product a faultless cut or an inacceptable cut so that adjustment of the laser has to be performed.

In another embodiment, the quality control device with an integrated pressure sensor determines the quality of the laser cut by applying an underpressure to the plastic product, such as the ampoule, the ampoule pack and/or the toggle region, i.e. the material between the neck regions of the ampoules. The mode of action is similar to the above described embodiment, however, it is not the force measured that is required to separate the ampoule, the ampoule pack and/or the toggle region from the surrounding residual material. Instead the quality control device with an integrated pressure sensor measures the force required to apply a certain under-pressure such as a certain vacuum.

While the pressure or force is applied from the above to the upper side of the single plastic products or the pack or bundle of plastic products, the underpressure or vacuum is applied from below the single plastic products or the pack or bundle of plastic products in order to separate the single plastic products or the pack or bundle of plastic products from the continuous plastic band and from the other single plastic products or the other packs or bundles of plastic products.

In a third embodiment of the invention the quality control device with an integrated pressure sensor applies a pulling force which can be determined in order to assess quality of the laser cut. Such a pulling force can be applied through means which grip the single plastic products or the pack or bundle of plastic products and separate them from the continuous plastic band and from the other single plastic products or the other packs or bundles of plastic products. The force required to separate the single plastic products or the pack or bundle of plastic products can be measured and is also an indication for the quality of the laser cut in order to assess if the laser cut was faultless or not sufficient.

Consequently according to the present invention it is not important if the separation of the single plastic products or the single packs or single bundles of plastic products is conducted by a pushing force such as pressure, or a pullin force or an under-pressure such as vacuum.

In a further embodiment, the device comprises a system to compensate for long-term drift effects of the laser beam and the controllable deflection means. This may occur due to changes in temperature, humidity, exposure to vibration, mechanical stress and aging of components and can affect the precision of the laser beam negatively. The system to compensate for long-term drift effects of the laser beam ensures that the precision of the laser is always optimal, reducing production losses, due to maintenance of the device, to an absolute minimum.

In one embodiment, a thermal imaging camera is used, to register the selective heating on a material surface lying outside of the cutting pattern, but still within the range of deflection of the mirror system of the controllable deflection means. The selective heating results by directing the beam for a short time on this material surface for a specific length of time. These short-term heating can for example be performed while the feeding-in device pulls the next interconnected plastic products provided in the continuous band under the laser and the optical acquisition unit. The thermal imaging camera compares the position on the receiver with previously programmed set/designed positions. The data collected is then transmitted to the laser control system to correct and adjust the cutting pattern. This control mechanism can take place both in or before each cutting process or at certain predefined intervals. The thermal imaging camera can also determine simultaneously the temperature of the heated material surface and conclude from this data on the laser power used for cutting the plastic products. A decrease in laser power can then be adjusted accordingly.

In another embodiment a band lying outside of the cutting pattern, but still within the range of deflection of the mirror system of the controllable deflection means, is drawn along within or outside of the plastic band, whereby the laser removes an amount of the material in the band in the form of a point. A camera compares the position of this point with a programmed reference point and any deviations are transmitted as correction data to the laser control system, similar to the process described above.

The interconnected plastic products for use in the medical field provided in the continuous plastic band are preferably bottles, bags or containers, and even more preferred ampoules. Furthermore, medical devices or parts of medical devices can be cut according to the invention, such as syringes, vials, hollow fibers for dialysators or parts of powder inhalers.

Particularly advantageous is the use of the device when cutting multi-layer plastic products, such as those produced via co-extrusion blow molding. These multi-layer plastic products combine the positive properties of different plastics together and are usually characterized by a barrier layer that is arranged between two carrier layers, which are connected together by a bonding agent. Preferably, these multi-layered plastic products are used in applications where improved barrier properties are needed to gases. Mechanical cutting methods have particularly problems with the joints of the multilayer plastic products. At the joints the barrier layer is naturally not very pronounced and there is an increased risk that the barrier layer is interrupted by the mechanical cutting in those areas. The inventive device has the advantage that the individual layers of the multilayer plastic products are fused together at the joints and along the edges during cutting with the laser. Consequently, the barrier properties of the joints, edges or seams remain intact and are even improved in comparison to mechanical cutting methods.

The process for separation of plastic products provided or surrounded by plastic can be applied and performed similar in principle with the described laser-control system with other plastic products such as consumer goods or industrial parts.

In a particularly preferred embodiment, the inventive device is operated in combination with a device, producing plastic products, under the BFS process (blow-fill-seal process). Such devices are well known and are described, for example in the patent EP 1626903 B1.

The inventive device is particularly advantageous for cutting plastic ampoules interconnected, joined together and/or linked together. These ampoules can e.g. be filled by the BFS process (blow-fill-seal process) but also empty ampoules can be processed. When plastic ampoules are manufactured under the BFS process (blow-fill-seal process), the ampoules leave the filling machine as rows of interconnected, joined together and/or linked together ampoules in a continuous band. In this continuous band one row of interconnected, joined together and/or linked together ampoules is followed by the next row of ampoules and all rows are embedded in the continuous band and surrounded by the residual plastic material. In order to produce as many ampoules within the continuous plastic band as possible, the ampoules are arranged very close together and thus the separation of the ampoules is very difficult. This is especially true for the toggle portion at the neck of the ampoules. The toggle portion at the neck of the ampoules is a critical area during mechanical punching as there is only a very small area that has to be cut out precisely and often only a partial separation can be achieved. Thus there is the constant risk when opening or separating a single ampoule that the neighbor ampoule is opened accidentally, due to the incomplete separation between the toggle portions of the ampoules. The inventive device can separate this portion of the ampoules safely without the risk of damaging the opening of the ampoules.

Ampoules in the medical field are usually provided as packs, i.e. a certain number of interconnected ampoules are punched out mechanically out of the continuous band. However, especially ampoules made of polypropylene tend to develop a sharp ridge when cut out mechanically or when one ampoule is separated manually from the ampoule pack.

In contrast to mechanical punching, cutting with the inventive device has the following advantages. The plastic ampoules are not required to cool down and can be cut at higher temperatures. Differences in the size of the ampoules which are inherent and cannot be avoided when manufacturing ampoules at high temperatures and the shrinking process of the ampoules when cooling down are detected by the device and the laser beam is adjusted accordingly. Furthermore, when cutting with the laser, the formation of sharp ridges and/or burr formation are avoided and the ampoules can be provided by the laser with perforations or breaking points between or in the plastic products, making them easier to separate from each other.

The combination of the inventive device with a machine for the production of plastic products under the BFS process (blow-fill-seal process) is especially advantageous, because there is no longer the need for establishment of a cooling line and the plastic products can be cut at higher temperatures immediately after production. Together with the above-mentioned advantages, this leads to increased efficiency, safety and economy.

The present invention also comprises an inventive method for cutting interconnected plastic products for use in the medical sector provided in a continuous band of plastic which comprises the following steps:

a) Providing interconnected plastic products embedded in a continuous band of plastic, b) Determining positional data for the interconnected plastic products embedded in the continuous band of plastic through an optical acquisition unit and calculation of a cutting pattern through a data processing unit, c) Controlling the laser by means of a laser control system, consisting of a controllable focusing optic, a controllable deflection means and a beam-forming means, wherein in dependence of the determined positional data the position and intensity of the focal point of the at least one laser is controlled, d) Cutting the interconnected plastic products provided in a continuous band of plastic according to the calculated cutting pattern.

In a preferred embodiment the plastic products or packs of plastic products are cut at temperatures of the plastic products or packs of plastic products of 60° C. to 155° C.

In further embodiments the method can further comprise one of the following steps e)-e"):

e) Performing a quality test by means of a quality control device with an integrated pressure sensor, which measures the force required to push out the cut plastic products or packs of cut plastic products.

e') Performing a quality test by means of a quality control device with an integrated pressure sensor, which measures the underpressure required to separate the cut plastic products or packs of cut plastic products.

e") Performing a quality test by means of a quality control device with an integrated pressure sensor, which measures the pulling force required to separate the cut plastic products or packs of cut plastic products.

Thus, by means of the integrated pressure sensor, the force, under pressure, pulling force or any other such force is measured, which is required to separate the plastic products from the surrounding residual material. A pressure or force or underpressure (such as vacuum) below a certain value (e.g. value A) indicates a proper and faultless cut without sharp ridges, while a pressure or force or underpressure above a certain value (e.g. value B) indicates an improper and faulty cut so that the plastic products cannot be separated or cannot be separated easily or cannot be separated without forming sharp ridges. A pressure or force or underpressure between the value A and value B indicates an insufficient cut where the plastic products can still be separated but might have sharp ridges. Depending on the plastic product, the kind of plastic used and the use of the plastic product in medicine, the cut plastic products obtained within the range between value A and value B might be sold as proper medical products or might be discard as unrectifiable rejects. Moreover depending on the plastic product, the kind of plastic used and the use of the plastic product in medicine the value A can be identical or almost identical to value B.

In a preferred embodiment, when the force to separate the plastic products from the surrounding material reaches a first predefined adjustable value, this indicates that the plastic products are still connected to the belt and have not been separated successfully, i.e. the force was not sufficient. This also implies that when this first threshold or first value has been reached, no further force is applied to separate the plastic products. This is important, because if the plastic products are still tightly connected to the surrounding residual material, applying an unlimited amount of force could lead to damage to the belt and the following plastic products, e.g. by overstretching the (hot) belt.

Furthermore, it is possible to predefine a second value/threshold which is under or below the first value. If the force required to separate the plastic products from the surrounding residual material exceeds this second value but is still under the first value, the plastic products were separated successfully, but this is an indication for an unsatisfactory and potentially harmful formation of sharp ridges or burrs. If the required force stays under this second value/threshold, then the quality of the laser cut is satisfactory and there is no risk of sharp ridges and/or burrs.

As described above it is clear to the skilled artisan that the exact first and second values or thresholds for the pressure/force depend on factors such as the kind of plastic to be cut, the thickness of the material, the temperature at which the cut is performed, the output power for the lasers and/or the geometry or size of the plastic products and the like. It is within the scope of the skilled artisan to determine through minimal experimentation, which pressure or force threshold is indicative for the plastic products in the continuous band. Thus, it is not complicated and even not inventive to find the right pressure range which indicates for the given plastic product a faultless cut or an inacceptable cut so that adjustment of the laser has to be performed.

In a preferred embodiment an ampoule belt (1) is pulled and positioned by a feeding-in device (2) under at least one controllable deflection means (5) and an optical acquisition unit (5a). The optical acquisition unit (5a) acquires the positional data of at least one ampoule strip (II) and the data processing unit calculates from the positional data a cutting pattern for cutting the ampoules (III) individually or in packs of several ampoules out of the at least one ampoule strip (II). The at least one focused laser beam (IV) is modified by the beam-forming means (4), such that the laser beam is suitable for separating the ampoules (III) through evaporation of the material between and/or around the ampoules. The controllable deflection means (5) and the controllable focusing optic (5b) control the at least one focused laser beam (IV) according to the cutting pattern calculated by the data processing unit, to cut the ampoules individually or in packs of several ampoules. After the cutting process the ampoule belt (1) is pulled further by the feeding-in device (2) and the next ampoule strip (II) is positioned under the controllable deflection means (5) and the optical acquisition unit (5a). The cut ampoules (III) are still located in the ampoule belt (1) and are now positioned under the quality control device with an integrated pressure sensor (7) and the knife for separating the strips (8). The quality control device with an integrated pressure sensor (7) and the knife for separating the strips (8) are triggered and the separated material between the toggle parts is collected in a separate container (14). The ampoules (III) are now separated completely from the ampoule belt (1) and are transported in an upright position over a slide to an external transport route (9) for further processing. The knife (8) separates the residual material (10) of the stripe from the belt and collects the residual material in the container (15). When the quality control device with an integrated pressure sensor (7) is triggered to press the ampoules (III) out of the belt it simultaneously measures the required pressure. If one or more ampoules are not separated as planned, then the required pressure to press the ampoules (III) out of the belt exceeds a previously adjustable threshold value, whereby the flap (11) is opened and the residual material with the filled ampoules (12) is dropped in the container (16). If the laser cutting device falls out completely, then two flaps (13) are triggered and the feeding-in device (2) transports the residual ampoule belt (1) uncut out of the device for later cutting.

In another embodiment the inventive device separates container products from a framework and/or among each other and consists of at least one laser with at least one laser control system and at least one optoelectronic system for image recognition and image processing, which determines the position of the container products in the framework and/or among each other and transmits these data to the at least one laser control system, whereby the at least one laser and/or laser beam is controlled such that the container products are separated from the framework and/or among each other. The other described inventive embodiments and examples in this application apply advantageously also on this embodiment.

Method for Cutting Plastic Products at Varying Temperatures

The present invention is furthermore directed to a method for cutting plastic products provided in a continuous band consisting of segments to be cut with one laser cut for use in the medical sector, wherein the method enables cutting of the plastic products provided in the continuous band at varying temperatures.

The application WO 2009030311 A1 describes a cutting device, for cutting single containers provided in a plastic band, characterized by a free falling mechanical punching device, which separates by free fall the single containers from the surrounding material. In another application WO 2009106219 A1 the mechanical punching device is powered by an electro motor, which moves the punching device from the starting position in a punching position.

When the plastic products leave the forming mould, they usually have to be cooled down, before separation from the surrounding residual material is possible. During the cooling process the plastic products are subject to temperature dependent changes in their size (shrinking). Thus, the prior art mechanical punching devices are dependent on a predetermined temperature, at which the plastic products can be separated, because only at this temperature does the size of the plastic products in the continuous band correlate with the shape of the punching tool. This means, that the mechanical punching device is positioned in a fixed distance from the plastic products manufacturing device, e.g. a Blow-Fill-Seal apparatus, so that the plastic products have an exact predetermined temperature, when they reach the mechanical punching device. However, if any inconsistencies, small deviations, and/or delays in the manufacturing process occur, than the plastic products no longer have the required temperature and thus the calculated size of the plastic products is no longer given. In consequence, the following mechanical punching inevitably causes damage and/or destroys the plastic products, while they are punched "out" from the surrounding residual material. Thus, almost all state of the art mechanical cutting devices for plastic products used in the medical field work at room temperature where the plastic product manufactured at higher temperatures has been completely chilled so that there is no variation in size anymore. If a mechanical cutting process is carried out at elevated temperatures, mechanical cutting devices require the feed of interconnected plastic products to be cut which have almost identical temperature due to the fact that change of temperature of the plastic products will cause a change in their geometry and size. The mechanical cutting devices are not able to follow these changes in geometry and size so that cuts at different temperatures will cause inaccurate or faulty cuts, thereby producing unrectifiable rejects. Therefore a method is needed which is able to cut out plastic products of a segment of interconnected plastic products at any temperature or any temperature range between 30° C. and 155° C.

Thus, the further objective of the present invention is to provide a method for cutting plastic products or cutting segments of plastic products provided in a continuous band for use in the medical sector, wherein the method enables cutting of the plastic products or segments thereof provided in the continuous band at varying temperatures.

This objective is achieved by a method for cutting according to claim 12. Further preferred embodiments result from the depending claims, the examples, the figures and the description.

Consequently, a method is provided for cutting plastic products for use in the medical sector provided in a continuous band of plastic consisting of segments to be laser cut, comprising the following steps:
 a) Providing interconnected plastic products embedded in a continuous band of plastic consisting of segments to be laser cut, wherein each segment cools-down while being laser cut and has any temperature range when being cut within 30° C. to 155° C.,
 b) Determining positional data for the interconnected plastic products embedded in the continuous band of plastic in one segment through an optical acquisition unit and calculation of a cutting pattern through a data processing unit,
 c) Controlling the laser by means of a laser control system, consisting of a controllable focusing optic, a controllable deflection means and a beam-forming means, wherein in dependence of the determined positional data the position and intensity of the focal point of the at least one laser is controlled,
 d) Laser cutting the interconnected, cooling down plastic products, provided in a continuous band of plastic in one segment according to the calculated cutting pattern.

Therefore, the inventive method is useful for cutting warm or hot polymers and plastics, i.e. cutting polymers or plastics with a temperature of at least 30° C., preferred at least 60° C., preferred at least 80° C., further preferred at least 100° C., more preferred at least 115° C., more preferred at least 125° C., even more preferred at least 135° C., further preferred 145° C. and more preferred at least 155° C., whereby plastics and/or polymers can be cut even at temperatures from 200° C. to 250° C. Thus, at the beginning of the laser cut, the temperature of the segment has at least one of the above described temperatures.

In further embodiments at the beginning of the laser cut the segment has any temperatures ranging from 30° C. to 155° C., preferably from 35° C. to 125° C., more preferably from 40° C. to 110° C., still more preferably from 45° C. to 100° C., still more preferably from 50° C. to 90° C. and most more preferably from 55° C. to 80° C.

Thus, the inventive method allows the cutting of plastic products provided in a continuous band or within segments of the continuous band at any temperature and is totally independent from any changes in size of the plastic products due to shrinkage, e.g. while cooling down. Depending on the form and size of the plastic products, the exact type of plastic used and several other factors, the temperature of the plastic products can vary, which makes mechanical punching at a predetermined temperature only possible for very narrow applications, namely only one fixed manufacturing process for one product. Each change in one of these parameters inevitably necessitates a rearrangement of the manufacturing line, which does not only comprise the changing of the punching mould itself but also includes the repositioning of the whole punching device. This could be the case, when another type of plastic is used, which has a higher processing temperature and thus, has to cool for a longer period of time before mechanical punching is possible. In some instances it could not even be possible to rearrange the manufacturing line, because of only limited space available. Without the need for changing of punching moulds, rearrangement of the manufacturing line and the installment of a long cooling line, the provided method has a much greater flexibility, is more economically and saves a lot of space.

The term "interconnected plastic products provided in the continuous belt" is to be understood as an endless belt with a defined width, wherein the interconnected plastic products are embedded, i.e. are surrounded by the residual material.

The term "segment" is to be understood as the section for example in a continuous belt that is recognized in one single work cycle by the optical acquisition unit and were the cutting pattern is defined. Thus, a "segment" has a defined length and width, with a certain number of interconnect plastic products. Consequently, the proportions of the segments are directly dependent from the settings of the optical acquisition unit. The term "segment" is not to be understood in a physical sense in that there are e.g. precut fields or markings in the continuous belt, but is solely defined by the field of acquisition from the optical acquisition unit. A "segment" is preferably this part of the continuous band which is detected or picked by the optical acquisition and data processing unit in one work cycle and which preferably contains a certain number of interconnect plastic products. However the subdivision or partition of the continuous band into segments is a more theoretical construct due to the fact that the continuous band does not contain markers indicating the segments and due to the fact that the position of the segments can be selected arbitrarily. Moreover it is possible that two segments overlap or that two subsequent segments are not directly connected to each other.

Accordingly, with the inventive method it is possible to cut one segment, which has a certain temperature and directly cut a subsequent segment, which can have another temperature. Thus, each segment can be cut precisely independent from its temperature and the temperature of the previous or the following segment with plastic products in the continuous band. With a mechanical punching device, such precise cutting at varying temperatures is not possible. The plastic products would have different sizes due to the different temperatures and thus cannot be punched mechanically.

Thus, the method according to the invention is preferably used to cut plastic products that are in the process of cooling or heating, wherein the temperature of the segment to be cut is different at the beginning of the cutting process in comparison to the temperature at the end of the cutting process. The laser cutting is very accurate even when a temperature gradient exists, i.e. temperature changes during cutting in the plastic product or the plastic segment respectively. The cutting pattern for the plastic products can be acquired and processed correctly in a temperature range from −30° C. to +300° C. and preferably from +30° C. to +300° C. Any changes in the temperature of the plastic up to 1° C. per second can be acquired and processed. This includes also changes in consecutive cutting patterns and cutting modes as well as for changing plastic materials during the cutting of a cutting pattern or for consecutive segments and cutting patterns.

Consequently, in one embodiment at least one segment with interconnected plastic products has a varying temperature than any of the previous segments with the interconnected plastic products. The term "varying temperature" is to be understood to comprise any differences in temperature that exceed at least 0.5° C. This is particularly advantageous, if it comes to delays and/or small inconsistencies during the manufacturing process. In such cases it is still possible to cut the next segment with interconnected plastic products that are provided in the continuous belt, even though the size of the plastic products has changed due to the extra cooling time. Thus, with the inventive method it is preferred to cut interconnected plastic products provided in the continuous belt that have a cool-down rate of 0.01° C. to 5° C. per minute. In a preferred embodiment the interconnected plastic products provided in the continuous belt consist of polypropylene and/or polyethylene.

In another embodiment incomplete or incorrect cut segments are re-fed and then cut again at a lower temperature. Incomplete or incorrect cut segments are usually thrown away, because it was not possible to cut these segments again, as these segments had cooled down completely and would no longer fit in mechanical punching machines that are configured to punch segments with a higher temperature. With the inventive method these segments can be re-fed and then cut accordingly.

The inventive method can be performed with a device comprising at least one laser, at least one laser control system, at least one optical acquisition and data processing unit, and optionally a quality control device with an integrated pressure sensor for the detection of incorrect laser cuts.

The optical acquisition unit determines in a segment positional data of the plastic products provided in the continuous band and connected to each other. The positional data in the segment are used to calculate a cutting pattern, which is transmitted to the laser control system. In accordance to the cutting pattern, the position, intensity and focal point of the at least one laser beam is controlled through a focusing optic and a deflection means.

Accordingly, gas lasers, solid-state lasers and/or dye lasers can be used. The lasers belonging to the group of gas lasers comprise excimer laser, noble gas ion laser, metal vapor laser or molecular gas laser.

The group of excimer lasers includes but is not restricted to $H_2$-laser (116/123 nm), $Ar_2$-laser (126 nm), $F_2$-laser (157 nm), $Xe_2$-laser (172 nm), ArF-laser (193 nm), KrF-laser (248 nm), XeBr-laser (282 nm), XeCl-laser (308 nm) and XeF-laser (351 nm). Noble gas ion lasers include but are not restricted to $(Ar)^+$-laser (including ~460 nm, 480 nm, 500 nm, 520 nm), $(Kr)^+$-laser (650 nm) and He—Cd-laser (325 nm, 440 nm).

The group of metal vapor lasers includes but is not restricted to Cu-laser (500 nm, 545 nm) and Au-laser (310 nm, 605 nm). The group of molecular gas lasers comprises CO-laser (6-8 µm), $CO_2$-laser (9 µm, 10.6 µm, 11 µm) and $N_2$-laser (337 nm).

Solid-state lasers can be selected from ruby $Cr^{3+}:Al_2O_3$-laser (694 nm), Neodymium glass (Nd:Glass) laser (1062 nm), Neodymium-YAG-laser (1064 nm), Alexandrite-laser (755 nm), ALGaN/GaN-laser (400-500 nm), InGaAs/GaAs-laser (700-880 nm), InGaAsP/InP-laser (900-1100 nm) and Pb-Chalkogenide-laser (2.6-30 µm). The group of dye lasers comprises amongst others stilbenes, coumarins and rhodamines covering the whole spectrum from ~300 nm to 1300 nm.

In further embodiments the cutting process or the laser cut can be performed parallel, synchronous or consecutively by multiple lasers. Preferably the cutting process or the laser cut is performed by two lasers, more preferably by three lasers and most preferably by four lasers. There is no limit to the number of lasers. The number of lasers can be adapted and depends on the complexity of the cutting pattern and the size and dimension of the plastic products provided in the continuous band. It is also possible to split the laser beam with a beam splitter into multiple beams and control each beam independently from each other for the cutting process. Preferred are $CO_2$-laser and UV-laser. In particular preferred are $CO_2$-laser with a wave length of 9.4 µm, more preferably with 10.3 µm or 10.6 µm with a preferred output power of 200 W or between 180 W and 220 W respectively. Preferred UV-laser comprise solid-state lasers on the basis of Nd:YAG, YLF or Nd:VO4, where by means of frequency conversion with nonlinear crystals, the third harmonic with a wavelength of 355 nm or in the vicinity thereof is generated. These lasers enable an extremely fine focusing of the laser beam, which is suited to cut or separate or perforate the narrow connections between the plastic components completely or partially.

According to the inventive method, a focused laser beam is guided around the contours of the plastic products in the segment provided in the continuous band to melt or evaporate the material between the products and/or the continuous band. The Gaussian intensity distribution of the laser beam cross-section ensures that the laser radiation melts the material at the edges and no burr formation occurs. This has the advantage that at the edge of the plastic products no sharp edges form that may damage e.g. sterile gloves used in the medical field or even lead to cuts to the hand of the person working with the cut plastic products. The separation with a laser beam has distinct advantages over mechanical separation devices like e.g. punching devices, because the use of mechanical devices leads inherently to the formation of burrs or sharp edges. The sharpness of the resulting burr and/or the cutting edge is directly dependent form the hardness/rigidity of the plastic material.

The plastics are preferably selected from the group consisting of polyamides, polyolefins or copolymers, as well as combinations of such plastics or copolymers in the form of composite materials. Preferably the plastic is polyethylene (PE), even more preferred is polypropylene (PP) or any other plastic with at least the hardness/rigidity, tensile strength, torsion module, Young's modulus and/or melting range of polypropylene (PP). Any plastic, that is at least as rigid or hard or even more rigid or harder as PP can be cut preferably according to the present invention. The laser cut of the segment or the laser cutting of PP is performed at any temperature between 30° C. to 155° C., preferably between 35° C. to 125° C., more preferably between 40° C. to 110° C., still more preferably between 45° C. to 100° C., still more preferably between 50° C. to 90° C. and most more preferably between 55° C. to 80° C.

Further plastics that can be used can be selected from the group consisting of or comprising: polyvalerolactones, poly-E-decalactones, polylactonic acid, polyglycolic acid, polylactides, polyglycolides, copolymers of the polylactides and polyglycolides, poly-ϵ-caprolactone, polyhydroxybutanoic acid, polyhydroxybutyrates, polyhydroxyvalerates, polyhydroxybutyrate-co-valerates, poly(1,4-dioxane-2,3-diones), poly(1,3-dioxane-2-ones), poly-p-dioxanones, polyanhydrides such as polymaleic anhydrides, polyhydroxymethacrylates, fibrin, polycyanoacrylates, polycaprolactonedimethylacrylates, poly-b-maleic acid, polycaprolactonebutylacrylates, multiblock polymers such as from oligocaprolactonedioles and oligodioxanonedioles, polyether ester multiblock polymers such as PEG and poly-butyleneterephtalate, polypivotolactones, polyglycolic acid trimethyl-carbonates, polycaprolactone-glycolides, poly-g-ethylglutamate, poly(DTH-iminocarbonate), poly(DTE-co-DT-carbonate), poly(bisphenol-A-iminocarbonate), poly-orthoesters, polyglycolic acid trimethyl-carbonates, polytrimethylcarbonates, polyiminocarbonates, poly(N-vinyl)-pyrrolidone, polyvinylalcoholes, polyesteramides, glycolated polyesters, polyphosphoesters, polyphosphazenes, poly[p-carboxyphenoxy)propane], polyhydroxypentanoic acid, polyanhydrides, polyethyleneoxide-propyleneoxide, polyurethanes, polyether esters such as polyethyleneoxide, polyalkeneoxalates, polyorthoesters as well as copolymers thereof, carrageenanes, collagen, polyhydroxyalkanoates, pectic acid, actinic acid, carboxymethylsulphate, collagen, collagen-N-hydroxysuccinimide, polyacrylic acid, polyacrylates, polymethylmethacrylate, polybutylmethacrylate, poly-acrylamide, polyacrylonitrile, polyamides, polyetheramide, polyethylene amine, polyimides, polycarbonates, polycarbourethane, polyvinyl ketones, polyvinyl halides, polyvinylidene halides, polyvinyl ethers, polyvinyl aromatics, polyvinyl esters, polyvinylpyrrolidone, polyoxymethylene, polybutylene, polytetrafluoroethylene, polyolefin elastomers, polyisobutylene, EPDM Rubber, Fluorosilicone, carboxymethylchitosan, polyethylene terephthalate, Polyvalerate, ethyl vinyl acetate copolymers, polysulfones, polyethersulfones, epoxy resins, ABS resins, silicones such as polysiloxanes, Polyvinylhalogene and copolymers and/or mixtures of the aforementioned polymers as well as laminates and multi-layer systems of the aforementioned polymers.

Plastic products made of polypropylene have the great advantage over plastic products made of polyethylene that they can be autoclaved and sterilized at or above temperatures of 121° C. This is of particular importance in the medical sector, where it is essential to ensure that all germs are killed. Because of the higher temperatures necessary to process polypropylene the plastic products have to be cooled down over a longer distance and/or a longer time before it is possible to cut the plastic products out of the continuous plastic band wherein the single plastic products are connected to each other. Moreover, PP is much harder than PE and mechanical cutting or punching leads naturally to even more sharp burrs and/or cutting edges.

With the inventive method it is possible to cut plastics, especially PP with a high processing temperature directly after processing. It is not necessary to wait for the plastics to cool down nor is it needed to install long conveyer bands to cool the plastic products during transportation down to a temperature at which it is possible to cut the plastic products. Consequently, it is also preferred to cut plastics that have a high Young's modulus and thus tend to form sharp burrs and/or edges when cut or punched mechanically. Especially preferred is polypropylene, which is regularly specified with a melting range between 160° C. and 170° C. and a Young's modulus of about 1520 N/mm$^2$. Thus, such plastics are preferred which have a melting range above 160° C., more preferred above 180° C., further preferred above 200° C. and especially preferred above 220° C. and can be routinely autoclaved at or above temperatures of 121° C. without getting deformed. Furthermore, such plastics are preferred which have an operating temperature above 100° C., more preferred above 110° C. and/or with a Young's modulus above 1500 N/mm$^2$, more preferred above 1700 N/mm$^2$ and further preferred above 1900 N/mm$^2$. An especially preferred plastic that can be cut with the inventive device is polypropylene and any other plastics, characterised by a melting range, tensile strength, torsion module or hardness/rigidity in the range of polypropylene, wherein "in the range" of is defined as ±10% to the corresponding value of polypropylene, i.e. a value of −10% to +10% of polypropylene.

The inventive method uses a laser to cut the plastic products provided in the continuous band of plastic. A cooling line for the hot plastic products is not necessary, because the laser can cut the hot material or the hot material in the process of cooling down respectively, safely and precisely. This is especially advantageous, when cutting plastic products for the medical sector at elevated temperatures directly or shortly after the plastic products leave the molding roll, when they already start to harden. Additionally, it is possible to perforate the narrow connections between the plastic components completely or partially or to induce predetermined breaking points making it easier to separate the plastic products from each other. This is especially advantageous when the plastic products are made of polypropylene, which is extremely tenacious after cooling down making it difficult to separate the plastic products manually without any further mechanical aid e.g. a scissor.

The term "cutting" or "laser cutting" as used herein shall be understood as cutting through plastic material with a laser beam, preferably polypropylene and similar polymers or polyethylene, this also includes perforating, i.e. alternating parts of cut through and uncut parts as well as cutting partially through or thinning parts, in the meaning that the material at the cutting point is not completely cut through but only the thickness is reduced, i.e. the material bonding still exists, but can be separated mechanically with less force. Thus, the term "cutting" or "laser cutting" describes cutting completely through the plastic material along the whole cutting pattern or only at specific points of the cutting pattern as well as perforating the plastic material along the whole cutting pattern or only at specific points of the cutting pattern, i.e. completely cut through parts alternate with uncut parts. Preferably the term "cutting" or "cut" or "laser cut" is to be understood as the cutting done in one segment of the continuous belt. After the cutting has been done in one segment, the next cutting in the subsequent segment is performed. Thus, each cutting pertains to one segment, and each segment starts a new cutting process named as the "cut" or the "laser cut".

The term "cutting pattern" is to be understood as the totality of all parts to be cut, which are acquired by the optical acquisition unit in one detection step/work cycle. The cutting pattern can be positioned in a segment of a continuous band of interconnected plastic products. Thus the term "cutting pattern" refers to the entirety of single cut-lines within one segment. Thus, if it is intended to cut plastic products in a continuous band or belt of interconnected plastic products, the optical acquisition unit gradually acquires a part (i.e. segment) of the continuous band or belt of interconnected plastic products, which is fed to the inventive device and then is cut according to the cutting pattern. The cutting pattern comprises the plastic products, acquired through the optical acquisition unit, which are usually three-dimensional and lie above and below the plane level and are defined through the continuous band or the continuous belt, which can comprise further user definable and thus predefined information concerning the cutting mode. The optical acquisition unit can detect for example, where the cutting is to be performed. The mode of cutting (completely, partially, perforating, etc.) can be predetermined by the user. Alternatively or additionally the optical acquisition unit can detect respective markings, which do not only give information where the cuts are to be made but also the mode of cutting can be included as information. Naturally a combination of the aforementioned is possible, thus a mix of predefined patterns and automatic detection of the cutting mode and/or cutting pattern is possible. Instead of a continuous band or a continuous belt it is also possible that single units or only parts of the continuous band, i.e. isolated segments, are detected by the optical acquisition unit.

The cutting pattern and eventually the cutting mode is determined anew by the optical acquisition unit for each segment, thus it is possible to handle various cutting patterns and cutting modes in random order. This is a distinct advantage over mechanical cutting and/or punching processes. The mechanical punching or mechanical cutting tool are determined for a defined cutting pattern or defined cutting mode and cannot adapt to changes in alternating segments with different cutting patterns and cutting modes. The laser cutting device can handle up to ten different cutting patterns with different cutting modes, which is impossible to achieve with a mechanical cutting or punching tool. Even if different punching or cutting tools are used, there are still only a limited number of patterns that can be handled. The device is independent of the exact cutting pattern, i.e. is not restricted to a specific pattern but can detect and handle any cutting pattern.

The cutting pattern is determined through suitable markings, which are detected by the optical acquisition unit. This can include colored markings, spatial markings as well as radioactive markings.

Colored markings include for example, colored markings in the visible range, infrared range or UV range and can be incorporated or attached to the plastic. This extends also to other materials which can be incorporated or attached to the plastic and are distinguishable from the plastic material such as thin filaments, wires or micro particles. Spatial markings on the other hand can be realized as elavations, dents or holes in the plastic material. Radioactive markers are radioactive substances incorporated or attached to the plastic material, wherein a radioactively labeled substance or solution in the plastic product may serve as a marker.

The data processing unit determines which parts of the cutting pattern are to be cut by the laser completely, or are only perforated, thinned and/or are not to be processed. Thus, the laser is capable of cutting specific parts completely, perforate them, reduce the thickness of the material to a specific degree and/or ignore specific parts, all within the limits of the detected and/or predetermined cutting pattern by the optical acquisition unit, depending on which mode of cutting was predefined by the user or a marking in the cutting pattern or a segment respectively. The laser is under the control of the data processing unit and is guided according to the cutting pattern detected by the optical acquisition unit and the predefined cutting mode.

The use of the laser beam for accurate cutting of the plastic products is dependent from the optical acquisition unit, which determines positional data of the interconnected plastic products provided in the continuous plastic band. The positional data can comprise information about the forms, sizes, shapes, geometric forms, laser markings, shadow projection, color recognition, light/dark zones or reflections which are detected by the optical acquisition unit.

In a preferred embodiment the optical acquisition unit comprises a camera. In another preferred embodiment a laser scanner is used together with a detector to determine positional data by measuring the interconnected plastic products provided in the continuous plastic band. The laser can be diverted by a mirror system to depict a complete surface profile of the plastic products.

The positional data are transmitted to a data processing unit, e.g. a programmable micro processor, where they are further processed. The term "processed" is to be understood in the way that the actual determined positional data is compared with positional data stored in the data processing unit. For each combination of positional data a cutting pattern is stored in the data processing unit, which is transmitted to the laser control system to control the laser.

This has the advantage that a precise dimensional accuracy of the plastic products provided in the belt is not required, because the optical acquisition unit detects the respective actual state of the plastic products. Particularly for the manufacture of plastic products usually high temperatures are used. The resulting temperature-dependent expansion and/or shrinking of the plastic has made an e.g. mechanical punching only possible at fixed lower temperatures. The use of the inventive method eliminates this problem and the plastic products can be cut accurately at different and varying temperatures. Moreover, it follows that when cutting various different plastic products, a complicated conversion of the device is not necessary, because only the cutting patterns must be changed for the positional data.

In another preferred embodiment the positional data are not compared with the stored positional data, but the data processing unit calculates the respective cutting pattern from the acquired positional data and transmits the calculated cutting pattern to the laser control system to control the laser.

In a further preferred embodiment positional data as well as cutting patterns are stored, which are corrected by the respective actual positional data, leading to an adapted cutting pattern which is transmitted to the laser control system to control the laser.

The laser control system consists preferably of a controllable focusing optic, a controllable deflection means and a beam-forming means. In this context the term "controllable" is to be understood that the focusing optic and the deflection means can be controlled with the cutting patterns calculated by the data processing unit and further that the data are transmitted in a suitable format. The beam-forming means collimates the laser beam and reduces the divergence of the beam for the purpose of a better focusing. In accordance with the determined positional data, the position of the focus and intensity of the focal point of the at least one laser is controlled by a controllable focusing optic and a controllable deflection means. If more than one laser is used preferably each laser is controlled by another laser control system.

In an embodiment the laser control system comprises a beam-forming means, which collimates the laser beam, a telescopic lens system, which reduces the divergence of the beam for the purpose of a better focusing, a mirror deflection system, which guides the laser beam in two- or three-dimensions around the interconnected plastic products according to the predetermined cutting pattern, a focusing optic, which focuses the laser beam such that the plastic material is evaporated during the movement of the laser beam and a software-controlled electronics, which converts the data for the cutting pattern in mirror movements.

In a preferred embodiment, the controllable deflection means is a galvanometer scanner, deflecting the direction of the laser beam with mirrors. In more preferred embodiments, the galvanometer scanner deflects the laser beam over two or more mirrors. Depending on the geometric properties of the plastic products one or more controllable deflections means can be used. In a preferred embodiment, no relative movement takes place between the plastic product and the laser optics, i.e. the laser optics is fixed and immovable, and the laser beam is controlled only by the controllable deflection means.

In another embodiment the laser beam is not deflected by a controllable deflection means, but the laser optics or a part of the laser optics is moved relative to the plastic product to perform the cutting process. The term laser optics comprises all the components necessary for forming, focusing, controlling or amplifying the laser beam. For example, only the lens and the mirror system can be moved, or only the lens, or only the mirror system or the entire laser optics relative to the plastic product.

In a particularly preferred embodiment the laser beam is controlled by a movable controllable deflection means. The term movable in this context means that the controllable deflection means can be moved in the x, y and z axis. This ensures that the laser beam can also reach and cut areas which are difficult to access.

A further advantage is that the controllable deflection means can also be used to simultaneously label the ampoules, thus cutting and labeling is done in one work process.

The focusing optic is preferably a lens or a mirror, more preferably a convex lens or a focusing concave mirror. The concave mirror provides the further advantage that each laser wavelength can be focused on the same point without having to use special optical materials.

In one embodiment, the device comprises a conveying unit for the interconnected plastic products provided in the continuous band. This conveying unit consists preferably of a feeding-in device that pulls the interconnected plastic products provided in the continuous band under the laser and the optical acquisition unit. This allows a high throughput and a full automatic cutting of the plastic products provided in the continuous band. Moreover incompletely or faulty cut segments of the continuous band could be introduced into the laser cutting process again in order to complete cutting. The re-introduced segments have further cooled down or cooled down to room temperature before they were re-introduced into the cutting process. However the inventive method is able to complete the incorrect or faulty laser cut within these segments even at quite different temperatures in comparison to the temperatures where the original incorrect or faulty laser cut was performed. The rejects are detected anew by the optical acquisition and data processing unit and the laser-cut is repeated without the need to adjust the complete device to the new temperature of the rejects and without the need to warm the rejects up to temperatures where the original laser cut was performed.

In other embodiments the conveying unit is a conveyor belt on which the interconnected plastic products are transported.

One of the significant advantages of laser separation of plastic products, e.g. ampoules, bags or other cavities is to create a fused edge as opposed to a sharp ridge after mechanical separation. This is especially important when cutting plastic products for use in the medical sector because a sharp ridge may cause damage to sterile gloves or may even injure the hand of the doctor or of the hospital staff when using such ampoules. Mechanically cut plastic products have always sharp ridges due to the fact that at the side where the cutting blade leaves the cut line a sharp ridge will occur.

The conventional laser cutting process with a fixed beam and focusing through a nozzle for processing gas may also lead to burrs on the edges. It is better to cut the ampoules with a movable beam, e.g. with a galvo scanner, because this method can be carried out more precisely by fine tuning of laser parameters and beam-forming elements, such as telescopes and lenses and scanner movements so that the edges are fused at the joints. To achieve this, a sensor and a control system are required as.

However, even with this kind of separation it is possible that the cut plastic products, e.g. ampoules, are not separated with fused edges. This is the case when a barely perceptible sharp ridge holds the ampoules together. When the ampoules are then finally separated, the sharp ridges still remain. Such sharp ridges can be the result of slight power fluctuation of the laser or a barely detectable variation in the beam direction.

Since the ampoules are provided within a pack of ampoules with very narrow connections, the quality of the laser cut can usually only be evaluated with a very complex image recognition system and special cameras. Such a system slows down the whole manufacturing process, is inherently expensive and prone to malfunctions and cannot easily be integrated in existing systems.

In another embodiment of the invention, the laser cutting device can optionally comprise a quality control device with an integrated pressure sensor for pressing out the cut plastic products. The interconnected plastic products provided in the continuous plastic band are preferably not separated completely by the laser from the residual material, i.e. the framework, so that the cut plastic products can be transported within the surrounding material until the final separation takes place. During the laser cutting, precisely defined narrow connections are left between the plastic products and the surrounding residual material. For the final separation step the plastic products are transported under the quality control device with an integrated pressure sensor. A stamp with the form of the ampoule pack or a stamp with a certain number of pins which hit predefined locations of the single plastic product or of a section of the continuous plastic band, i.e. an adapted stamp, presses the plastic products and especially the material between the toggle parts of the ampoules, i.e. the material between the neck regions of neighboring ampoules, out of the residual surrounding material. If the pressure or force necessary to push the ampoules out of the surrounding material and/or the material between the toggle regions exceeds a predefined first adjustable value, this is an indication that the plastic products are not sufficiently separated and are still connected with the surrounding material, i.e. are still connected to the belt or to each other.

Instead of a stamp which actually hits the plastic products or units or bundles of plastic products in order to separate them, a gas blow such as an air blow or multiple gas blows generated by one or a plurality of nozzles can be used to put a kind of gas blow pressure on the plastic products or units or bundles of plastic products. Thereby the single gas blows are generated with a defined pressure which again indicates the quality of the laser cut by determining if the gas blow or the gas blows were sufficient to separate the single plastic products or units or bundles of plastic products. Instead of a gas the skilled person may also use a liquid such as water for the same purpose.

Thus, the quality control device with an integrated pressure sensor is directed to pressing the laser cut plastic products out of the surrounding residual material of the continuous band thereby generating single plastic products or units of plastic products which are still attached to each other but already perforated preferably by the laser used in the cutting device so that the separation can be done easily without forming sharp ridges. This is usually performed with an adapted mould having the form of the ampoule or ampoule packs. Additionally, narrow stamps can be included that push out the residual material between the toggle parts, i.e. the area between the neck regions of two adjacent ampoules. If a predefined first adjustable value is exceeded, then the laser cutting was not sufficient and the plastic products are collected separately. This has the advantage that insufficiently cut plastic products can be separately collected from the correctly cut plastic products and then proceeded later again and thus are not lost as waste. Thus in one embodiment the quality control device with an integrated pressure sensor consists of a mould adapted to the form of the ampoules, which presses the plastic products precisely out of the surrounding residual material.

Furthermore, the quality control device with an integrated pressure sensor can control the quality of the laser cut, i.e. the quality of the intended separation, by measuring the resistance and/or force that is necessary to press the plastic products out of the surrounding residual material. The pressure/force necessary to push the ampoules out of the surrounding material and/or the toggle parts of the ampoules, i.e. the material between the neck regions of neighboring ampoules, gives direct information on whether the laser cut did successfully melt the material at the edges so that no sharp burr formation has occurred.

The applicant has found when laser cutting, for instance, polypropylene ampoules that the following applies:

If the pressure sensor does not register any resistance, the ampoules are separated correctly and the edges are completely fused around the ampoules If the pressure sensor registers a resistance up to 0.5 N to push the ampoules out of the surrounding residual material, then only a negligible ridge has formed and the use of the ampoule is safe.

If the pressure sensor registers a resistance over 0.5 N to push the ampoules out of the surrounding residual material, then a significant sharp ridge has formed and the ampoules are possibly harmless and will be sorted out.

Thus, if the required pressure necessary to push the plastic products such as bags, bottles, cylinders, ampoules or other cavities out of the surrounding material and/or the toggle parts of the ampoules, i.e. the material between the neck regions of neighboring ampoules exceeds a second threshold but is still under the first threshold, this gives an indication that the laser cut is unsatisfactory and potentially harmful formation of sharp ridges or burrs in the plastic product has occurred.

In a further embodiment, the quality control is performed at the material between the toggle parts, i.e. the area between the neck regions of two adjacent ampoules.

Thus, the force required to push the plastic products out of the surrounding residual material provides information on whether the plastic product was cut correctly, i.e. the plastic products can be pushed out of the surrounding material or not. Furthermore, the required force indicates, whether the ridges are safe or if any sharp ridges have formed that may be potentially harmful.

Having described quality control device with an integrated pressure sensor it is clear to the skilled artisan that the exact first and second values or thresholds for the pressure/force depend on factors such as the kind of plastic to be cut, the thickness of the material, the temperature at which the cut is performed, the output power for the lasers and/or the geometry or size of the plastic products and the like. It is within the scope of the skilled artisan to determine through minimal experimentation, which pressure or force threshold is indicative for the plastic products in the continuous band. Thus, it is not complicated and even not inventive to find the right pressure range which indicates for the given plastic product a faultless cut or an inacceptable cut so that adjustment of the laser has to be performed.

In another embodiment, the quality control device with an integrated pressure sensor determines the quality of the laser cut by applying an underpressure to the plastic product, such as the ampoule, the ampoule pack and/or the toggle region, i.e. the material between the neck regions of the ampoules. The mode of action is similar to the above described embodiment, however, it is not the force measured that is required to separate the ampoule, the ampoule pack and/or the toggle region from the surrounding residual material. Instead the quality control device with an integrated pressure sensor measures the force required to apply a certain under-pressure such as a certain vacuum.

While the pressure or force is applied from the above to the upper side of the single plastic products or the pack or bundle of plastic products, the underpressure or vacuum is applied from below the single plastic products or the pack or bundle of plastic products in order to separate the single plastic products or the pack or bundle of plastic products from the continuous plastic band and from the other single plastic products or the other packs or bundles of plastic products.

In a third embodiment the quality control device with an integrated pressure sensor applies a pulling force which can be determined in order to assess quality of the laser cut. Such a pulling force can be applied through means which grip the single plastic products or the pack or bundle of plastic products and separate them from the continuous plastic band and from the other single plastic products or the other packs or bundles of plastic products. The force required to separate the single plastic products or the pack or bundle of plastic products can be measured and is also an indication for the quality of the laser cut in order to assess if the laser cut was faultless or not sufficient.

Consequently, it is not important if the separation of the single plastic products or the single packs or single bundles of plastic products is conducted by a pushing force such as pressure, or a pullin force or an under-pressure such as vacuum.

In a further embodiment, the device comprises a system to compensate for long-term drift effects of the laser beam and the controllable deflection means. This may occur due to changes in temperature, humidity, exposure to vibration, mechanical stress and aging of components and can affect the precision of the laser beam negatively. The system to compensate for long-term drift effects of the laser beam ensures that the precision of the laser is always optimal, reducing production losses, due to maintenance of the device, to an absolute minimum.

In one embodiment, a thermal imaging camera is used, to register the selective heating on a material surface lying outside of the cutting pattern, but still within the range of deflection of the mirror system of the controllable deflection means. The selective heating results by directing the beam for a short time on this material surface for a specific length of time. These short-term heating can for example be performed while the feeding-in device pulls the next interconnected plastic products provided in the continuous band under the laser and the optical acquisition unit. The thermal imaging camera compares the position on the receiver with previously programmed set/designed positions. The data collected is then transmitted to the laser control system to correct and adjust the cutting pattern. This control mechanism can take place both in or before each cutting process or at certain predefined intervals. The thermal imaging camera can also determine simultaneously the temperature of the heated material surface and conclude from this data on the laser power used for cutting the plastic products. A decrease in laser power can then be adjusted accordingly.

In another embodiment a band lying outside of the cutting pattern, but still within the range of deflection of the mirror system of the controllable deflection means, is drawn along within or outside of the plastic band, whereby the laser removes an amount of the material in the band in the form of a point. A camera compares the position of this point with a programmed reference point and any deviations are transmitted as correction data to the laser control system, similar to the process described above.

The interconnected plastic products for use in the medical field provided in the continuous plastic band are preferably bottles, bags or containers, and even more preferred ampoules. Furthermore, medical devices or parts of medical devices can be cut according to the invention, such as syringes, vials, hollow fibers for dialysators or parts of powder inhalers.

Particularly advantageous is the use of the method when cutting multi-layer plastic products, such as those produced via co-extrusion blow molding. These multi-layer plastic products combine the positive properties of different plastics together and are usually characterized by a barrier layer that is arranged between two carrier layers, which are connected together by a bonding agent. Preferably, these multi-layered plastic products are used in applications where improved barrier properties are needed to gases. Mechanical cutting methods have particularly problems with the joints of the multilayer plastic products. At the joints the barrier layer is naturally not very pronounced and there is an increased risk that the barrier layer is interrupted by the mechanical cutting in those areas. The inventive method has the advantage that the individual layers of the multilayer plastic products are fused together at the joints and along the edges during cutting with the laser. Consequently, the barrier properties of the joints, edges or seams remain intact and are even improved in comparison to mechanical cutting methods.

The process for separation of plastic products provided or surrounded by plastic can be applied and performed similar in principle with the described laser-control system with other plastic products such as consumer goods or industrial parts.

The inventive method is particularly advantageous for cutting plastic ampoules interconnected, joined together and/or linked together. These ampoules can e.g. be filled by the BFS process (blow-fill-seal process) but also empty ampoules can be processed. When plastic ampoules are manufactured under the BFS process (blow-fill-seal process), the ampoules leave the filling machine as rows of interconnected, joined together and/or linked together ampoules in a continuous band. In this continuous band one row of interconnected, joined together and/or linked together ampoules is followed by the next row of ampoules and all rows are embedded in the continuous band and surrounded by the residual plastic material. In order to produce as many ampoules within the continuous plastic band as possible, the ampoules are arranged very close together and thus the separation of the ampoules is very difficult. This is especially true for the toggle portion at the neck of the ampoules. The toggle portion at the neck of the ampoules is a critical area during mechanical punching as there is only a very small area that has to be cut out precisely and often only a partial separation can be achieved. Thus there is the constant risk when opening or separating a single ampoule that the neighbor ampoule is opened accidentally, due to the incomplete separation between the toggle portions of the ampoules. The inventive method can separate this portion of the ampoules safely without the risk of damaging the opening of the ampoules.

Ampoules in the medical field are usually provided as packs, i.e. a certain number of interconnected ampoules are punched out mechanically out of the continuous band. However, especially ampoules made of polypropylene tend to develop a sharp ridge when cut out mechanically or when one ampoule is separated manually from the ampoule pack.

In contrast to mechanical punching, cutting with the inventive device has the following advantages. The plastic ampoules are not required to cool down and can be cut at higher temperatures. Differences in the size of the ampoules which are inherent and cannot be avoided when manufacturing ampoules at high temperatures and the shrinking process of the ampoules when cooling down are detected by the device and the laser beam is adjusted accordingly. Furthermore, when cutting with the laser, the formation of sharp ridges and/or burr formation are avoided and the ampoules can be provided by the laser with perforations or breaking points between or in the plastic products, making them easier to separate from each other.

In a preferred embodiment the plastic products or packs of plastic products are cut at temperatures of the plastic products or packs of plastic products of 30° C. to 155° C.

In further embodiments the method can further comprise one of the following steps e)-e"):
- e) Performing a quality test by means of a quality control device with an integrated pressure sensor, which measures the force required to push out the cut plastic products or packs of cut plastic products.
- e') Performing a quality test by means of a quality control device with an integrated pressure sensor, which measures the underpressure required to separate the cut plastic products or packs of cut plastic products.
- e") Performing a quality test by means of a quality control device with an integrated pressure sensor, which measures the pulling force required to separate the cut plastic products or packs of cut plastic products.

Thus, by means of the integrated pressure sensor, the force, under pressure, pulling force or any other such force is measured, which is required to separate the plastic products from the surrounding residual material. A pressure or force or underpressure (such as vacuum) below a certain value (e.g. value A) indicates a proper and faultless cut without sharp ridges, while a pressure or force or underpressure above a certain value (e.g. value B) indicates an improper and faulty cut so that the plastic products cannot be separated or cannot be separated easily or cannot be separated without forming sharp ridges. A pressure or force or underpressure between the value A and value B indicates an insufficient cut where the plastic products can still be separated but might have sharp ridges. Depending on the plastic product, the kind of plastic used and the use of the plastic product in medicine, the cut plastic products obtained within the range between value A and value B might be sold as proper medical products or might be discard as unrectifiable rejects. Moreover depending on the plastic product, the kind of plastic used and the use of the plastic product in medicine the value A can be identical or almost identical to value B.

In a preferred embodiment, when the force to separate the plastic products from the surrounding material reaches a first predefined adjustable value, this indicates that the plastic products are still connected to the belt and have not been separated successfully, i.e. the force was not sufficient. This also implies that when this first threshold or first value has been reached, no further force is applied to separate the plastic products. This is important, because if the plastic products are still tightly connected to the surrounding residual material, applying an unlimited amount of force could lead to damage to the belt and the following plastic products, e.g. by overstretching the (hot) belt.

Furthermore, it is possible to predefine a second value/threshold which is under or below the first value. If the force required to separate the plastic products from the surrounding residual material exceeds this second value but is still under the first value, the plastic products were separated successfully, but this is an indication for an unsatisfactory and potentially harmful formation of sharp ridges or burrs. If the required force stays under this second value/threshold, then the quality of the laser cut is satisfactory and there is no risk of sharp ridges and/or burrs.

As described above it is clear to the skilled artisan that the exact first and second values or thresholds for the pressure/force depend on factors such as the kind of plastic to be cut, the thickness of the material, the temperature at which the cut is performed, the output power for the lasers and/or the geometry or size of the plastic products and the like. It is within the scope of the skilled artisan to determine through minimal experimentation, which pressure or force threshold is indicative for the plastic products in the continuous band. Thus, it is not complicated and even not inventive to find the right pressure range which indicates for the given plastic product a faultless cut or an inacceptable cut so that adjustment of the laser has to be performed.

In a preferred embodiment an ampoule belt (1) is pulled and positioned by a feeding-in device (2) under at least one controllable deflection means (5) and an optical acquisition unit (5a). The optical acquisition unit (5a) acquires in a segment the positional data of at least one ampoule strip (II) and the data processing unit calculates from the positional data a cutting pattern for cutting the ampoules (III) individually or in packs of several ampoules out of the at least one ampoule strip (II). The ampoule strip (II) can be named as a segment of the ampoule belt (1). This segment or ampoule strip (II) has a temperature of 67.5° C. when fed into the cutting device. When the laser-cut starts, the temperature of the segment or ampoule strip (II) is 67.1° C. The at least one focused laser beam (IV) is modified by the beam-forming means (4), such that the laser beam is suitable for separating the ampoules (III) through evaporation of the material between and/or around the ampoules. The controllable deflection means (5) and the controllable focusing optic (5b) control the at least one focused laser beam (IV) according to the cutting pattern calculated by the data processing unit, to cut the ampoules individually or in packs of several ampoules. After the cutting process the ampoule belt (1) is pulled further by the feeding-in device (2) and the next ampoule strip (II) is positioned under the controllable deflection means (5) and the optical acquisition unit (5a). The cut ampoules (III) are still located in the ampoule belt (1) and are now positioned under the quality control device with an integrated pressure sensor (7) and the knife for separating the strips (8). The quality control device with an integrated pressure sensor (7) and the knife for separating the strips (8) are triggered and the separated material between the toggle parts is collected in a separate container (14). The ampoules (III) are now separated completely from the ampoule belt (1) and are transported in an upright position over a slide to an external transport route (9) for further processing. The knife (8) separates the residual material (10) of the stripe from the belt and collects the residual material in the container (15). When the quality control device with an integrated pressure sensor (7) is triggered to press the ampoules (III) out of the belt it simultaneously measures the required pressure. If one or more ampoules are not separated as planned, then the required pressure to press the ampoules (III) out of the belt exceeds a previously adjustable threshold value, whereby the flap (11) is opened and the residual material with the filled ampoules (12) is dropped in the container (16). If the laser cutting device falls out completely, then two flaps (13) are triggered and the feeding-in device (2) transports the residual ampoule belt (1) uncut out of the device for later cutting. In case the quality control device with an integrated pressure sensor (7) detects an insufficient or inaccurate or faulty laser-cut of a segment or of an ampoule strip (II), this segment or ampoule strip (II) when separated from the ampoule belt (1) which is the continuous band can be re-introduced into the laser cutting process and is fed into the cutting device again. When feeding this separated segment or separated ampoule strip (II) again, this segment or ampoule strip (II) has meanwhile cooed down to 48° C. and has shrank. However the change in size and geometry of the re-fed segment or ampoule strip (II) does not effect the second laser-cut. The cutting pattern are newly detected by the optical acquisition unit (5a) and the laser-cut is again performed now resulting in a properly and accurate cut segment or ampoule strip (II). The properly and accurate cut segment or ampoule strip (II) is then processed as usual through the quality control device with an integrated pressure sensor (7) without detection of inaccurate or faulty cuts.

In another embodiment the inventive device separates container products from a framework and/or among each other and consists of at least one laser with at least one laser control system and at least one optoelectronic system for image recognition and image processing, which determines the position of the container products in the framework and/or among each other and transmits these data to the at least one laser control system, whereby the at least one laser and/or laser beam is controlled such that the container products are separated from the framework and/or among each other. The other described inventive embodiments and examples in this application apply advantageously also on this embodiment.

The following examples describe preferred embodiments of the present invention and are not to be understood to limit the invention in any way. Any alternatives and/or embodiments of the present invention that are natural or obvious for the skilled artisan are considered to be defined by the present invention and covered by the claims.

EXAMPLES

Example 1

Method for Cutting Interconnected Plastic Ampoules Provided in a Continuous Band:

A camera acquires the positional data for the interconnected plastic ampoules provided in a continuous band of plastic. The positional data is converted by the data processing unit in a cutting pattern for the laser beam. The exact path for separating the ampoules with the laser beams is obtained by conversion of a CAD graphics of the ampoules, which is transmitted in the form of converted commands to the laser beam control system. A beam-forming system, consisting of a lens system for improving the beam properties (4), modifies the laser beam (6) such that the beam is suitable for ampoule separation by evaporation and is also divided in several beams. Overall four $CO_2$-laser with an output power of 200 W each are deployed. To improve the focusing properties of the laser beams, the diameter of the laser beams is widened and adjusted to the following mirror deflectors. The mirror deflectors are dimensioned in such a way that the beam can move freely within the opening of the focusing optics after deflection over the necessary deflection range. In this example four mirror deflection systems and focusing optics are deployed stationary next to each other. The laser beams cut ampoule packs from an ampoule belt with twenty adjacent ampoules, each pack consisting of five ampoules. As a result of the ampoule geometrics the laser beams cannot reach the ampoule bottoms in the same work step. Consequently, the ampoule bottoms are separated in the previous work step. In the current work step the remaining sides of the ampoules packs are cut and the bottoms of the next ampoules are cut.

The ampoule packs are still connected by narrow connecting pieces to the outer framework, however, the single ampoule packs are separated completely from the adjacent ampoule packs. The material between the ampoules within a pack is perforated with the laser, which makes it easier to separate the ampoules manually.

Example 2

Device for Cutting Interconnected Plastic Ampoules for Use in the Medical Sector Provided in a Continuous Band:

The belt with the ampoule strips (1) that comes out of the filling machine is pulled by means of a feeding-in device (2) in a processing position under the mirror deflector (5). In this position, a digital camera takes an image of multiple reference markings and compares the position of these markings with the designed position of previously stored reference markings. Thus both the position and the size of the ampoules is registered and deviations in size and form due to varying temperatures or varying cooling areas within the ampoules or the ampoule strip (1) are corrected and transmitted for control of the laser beam.

The exact path for separating the ampoules with the laser beams is obtained by conversion of a CAD graphics of the ampoules, which is transmitted in the form of converted commands to the laser beam control system. A beam-forming system, consisting of a lens system for improving the beam properties (4), modifies the laser beam (6) such that the beam is suitable for ampoule separation by evaporation and is also divided in several beams. Overall four $CO_2$-lasers with an output power of 200 W each are deployed. To improve the focusing properties of the laser beams, the diameter of the laser beams is widened and adjusted to the following mirror deflectors. The mirror deflectors are dimensioned in such way that the beam can move freely within the opening of the focusing optics after deflection over the necessary deflection range. In this example four mirror deflections systems and focusing optics are deployed stationary next to each other. The laser beams cut ampoule packs from an ampoule belt with twenty adjacent ampoules, each pack consisting of five ampoules. As a result of the ampoule geometrics the laser beams cannot reach the ampoule bottoms in the same work step. Consequently, the ampoule bottoms are separated in the previous work step. In the current work step the remaining sides of the ampoules packs are cut and the bottoms of the next ampoules are cut.

All components necessary for beam formation are connected with enclosed (17) granite constructions (3) ensuring that no vibration or oscillation is transferred to the highly sensitive beam guiding system. A control program for the deflection of the movable mirrors guides the focused laser beams along the contours of the ampoules such that the ampoules are separated from the residual material save for a couple of narrow connections. After this process the feeding-in device (2) pulls the next ampoule strip in processing position. The completely or nearly completely separated ampoules as well as eventually existing material between the toggle parts is separated from the residual framework by the quality control device with an integrated pressure sensor (7) and the ampoules are transported in upright position over a slide to an external transport route (9) for further processing, wherein the residual material between the toggle parts is collected in a container (14). The quality control device with an integrated pressure sensor (7) consists of two simultaneously controlled stamps, wherein one stamp pushes the ampoule pack out and the other stamp pushes the residual material between the toggle parts. The stamps are moved pneumatically, wherein the pressure is adjustable. If the required pressure exceeds a first threshold, a sensor is activated, indicating an incomplete separation of the ampoules, the sensor then transmits a signal to the sorting device, which removes the ampoules. If the required pressure exceeds a second threshold but is still under the first threshold, a sensor is activated, indicating an unsatisfactory and potentially harmful formation of sharp ridges or burrs in the ampoules, the sensor then transmits a signal to the sorting device, which removes the ampoules. The removed ampoules are not unrectifiable rejects but can rather be re-introduced into the inventive cutting device for repeating the laser cut. Since this re-introduction can be done automatically the inventive cutting device or inventive cutting machine produces only a few unrectifiable rejects and thus saves costs and material and reduces waste.

A knife (8) separates the residual material (10) of the stripe from the belt and the residual material (10) is collected in a container (15). If one or more ampoules are not separated as planned and still are connected to the residual material, e.g. when the quality control device with an integrated pressure sensor transmits a signal to the sorting device, a flap (11) is opened and the residual material with the filled ampoules (12) is dropped in the container (16). If the laser cutting device falls out completely, then two flaps (13) are triggered and the feeding-in device (2) transports the uncut belt out of the device for later cutting.

BRIEF DESCRIPTION OF THE DRAWINGS

Each strip contains twenty ampoules, which are each interconnected to the rest of the surrounding material as well as with the neighboring ampoules on the sides and the toggle region. The laser cuts four ampoule packs with five ampoules each out of the ampoule strip containing twenty ampoules. This means that the two outermost ampoules in the ampoule strip are still connected to the surrounding material via some narrow connections; however, the connections between the ampoule packs, i.e. after every fifth ampoule, are separated completely from each other. The connections between the ampoules within the ampoule packs are perforated, which makes it easier to manually separate the ampoules from the ampoule packs. The material between the toggle regions of the ampoules are cut out completely and the upper edge of the ampoules are separated from the rest of material with the exception of some narrow connections. In this step, the bottoms of the ampoules of the next ampoule strip are separated from the surrounding material, again with the exception of a few narrow connections. The reason behind this is the ampoule geometrics, because the laser beams cannot reach the ampoule bottoms in the same work step. Consequently, the ampoule bottoms are separated in the previous work step. In the current work step the remaining sides of the ampoules packs are cut and the bottoms of the next ampoules are cut.

Figure 1:
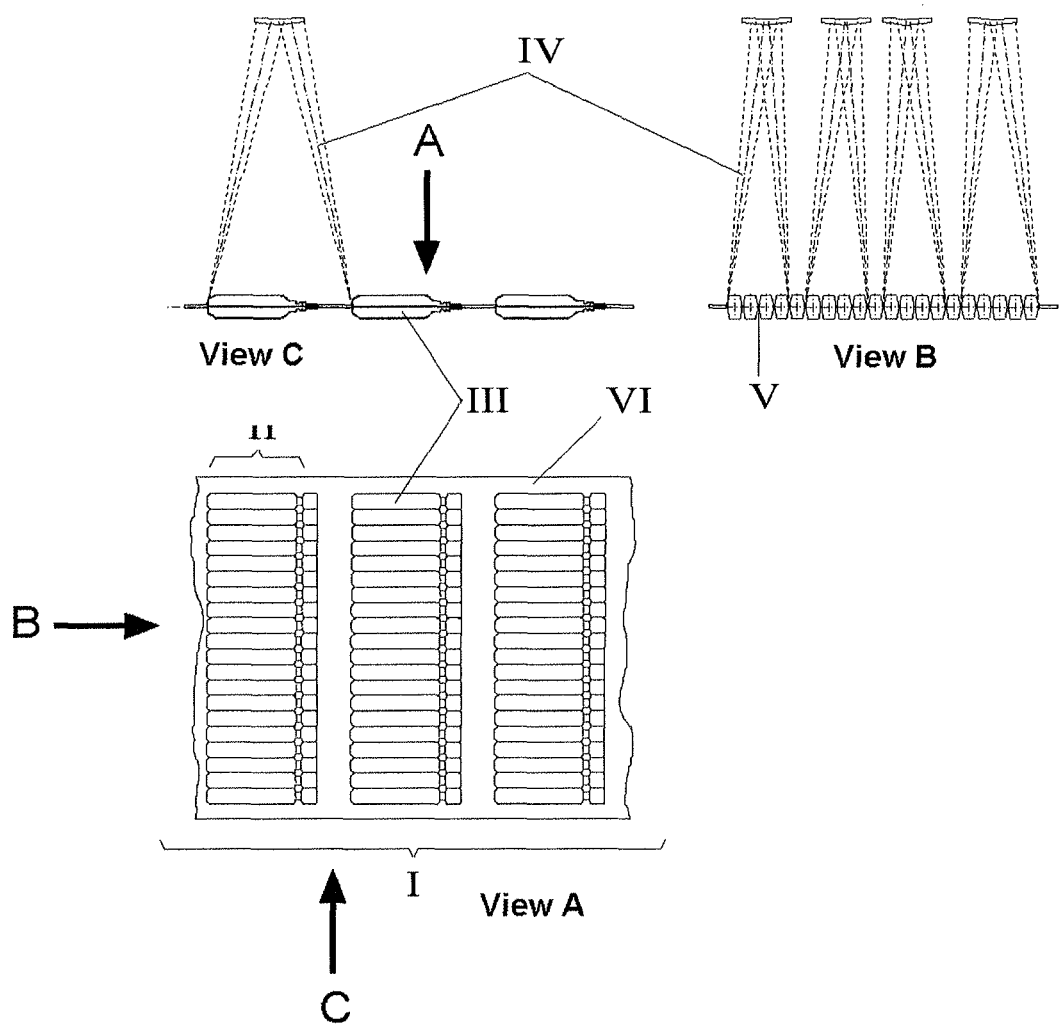
FIG. 1
View A:
Top view on a belt or continuous belt with interconnected plastic ampoules (only three ampoule strips are shown).
View B:
Side view of "View A" (left side). Shown are the ampoule bottoms of an ampoule strip. The dashed lines show schematically a snapshot of the laser beams.
View C:
Side view of "View A" (viewing direction in front). Shown are three ampoule strips in the belt.
Figure 2:
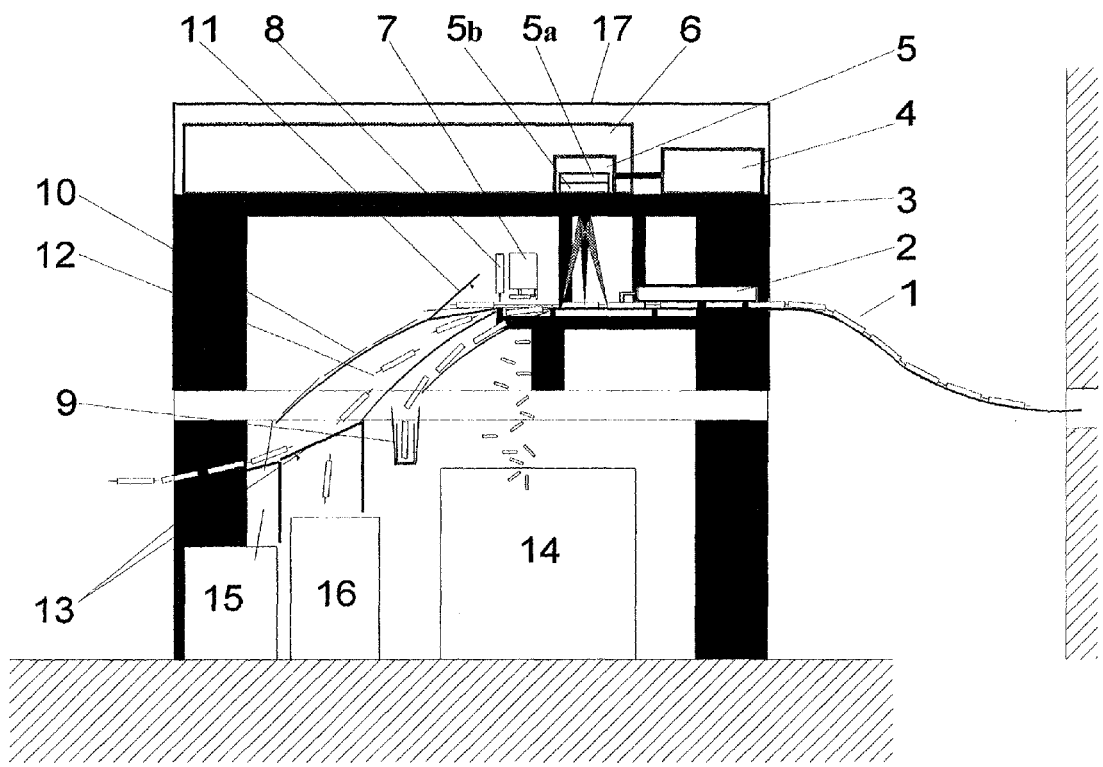
FIG. 2

Schematic side view of an embodiment for cutting interconnected plastic ampoules

The invention claimed is:

1. Process for cutting plastic products for use in the medical sector provided in a continuous band comprising the following steps:
   a) providing interconnected plastic products embedded in a continuous band of plastic, consisting of segments to be laser cut, the continuous band of plastic including a plurality of markings,
   b) determining positional data for the interconnected plastic products embedded in the continuous band of plastic and for the plurality of markings from the continuous band of plastic through an optical acquisition unit and comparing the determined positional data to stored positional reference data within a data processing unit to ascertain differences between the determined positional data and the stored positional reference data, and calculating a cutting pattern based on the determined plurality of markings, the determined positional data, and the ascertained differences between the determined positional data and the stored positional reference data with the data processing unit,
   c) controlling at least one laser with a laser control system comprising a controllable focusing optic, a controllable deflection means and a beam-forming means, wherein in dependence on the calculated cutting pattern, a position and intensity of a focal point of the at least one laser is controlled, and
   d) cutting, with the at least one laser the interconnected plastic products provided in the continuous band of plastic, as the interconnected plastic products cool down, according to the calculated cutting pattern, by detecting, with the optical acquisition unit, differences in size of the plastic products due to a shrinking process of the segments to be laser cut, wherein the shrinking process is caused by cooling down and adjusting the at least one laser to cut the plastic products during the shrinking process caused by the cooling down.

2. Process according to claim 1, wherein the interconnected plastic products are cut at temperatures of the interconnected plastic products of 60° C. to 155° C.

3. Process for cutting plastic products for use in the medical sector provided in a continuous band of plastic consisting of segments to be laser cut, comprising the following steps:
   a) providing interconnected plastic products embedded in a continuous band of plastic consisting of segments to be laser cut, wherein each segment cools-down while being laser cut and has any temperature range when being cut within 30° C. to 155° C.,
   b) determining positional data for the interconnected plastic products embedded in the continuous band of plastic in one segment through an optical acquisition unit by comparing the determined positional data to stored positional reference data within a data processing unit to ascertain differences between the determined positional data and the stored positional reference data, and calculating a cutting pattern through the data processing unit with the ascertained differences between the determined positional data and the stored positional reference data,
   c) controlling the laser by means of a laser control system, consisting of a controllable focusing optic, a controllable deflection means and a beam-forming means, wherein in dependence on the calculated cutting pattern, a position and intensity of a focal point of the at least one laser is controlled, d) cutting, with the at least one laser, interconnected plastic products provided in the continuous band of plastic in one segment as the plastic products cool down, according to the calculated cutting pattern, e) detecting, with the optical acquisition unit, differences in size of the plastic products due to a shrinking process of the segments to be laser cut, wherein the shrinking process is caused by cooling down, and f) adjusting the at least one laser to cut the plastic products during the shrinking process caused by the cooling down.

4. Process according to claim 3, wherein the interconnected plastic products provided in the continuous band cool-down with a rate of 0.01° C. to 5° C. per minute.

5. Process according to claim 3, wherein at least one segment of the interconnected plastic products has a different temperature than the interconnected plastic products in at least one previous segment.

6. Process according to claim 3, wherein the interconnected plastic products provided in the continuous band consist of polypropylene and/or polyethylene.

7. Process according to claim 3 wherein incomplete or incorrect cut segments are re-fed and then cut again at a lower temperature.

8. Process according to claim 3 further comprising:

g) performing, with a quality control device having an integrated pressure sensor, a quality test by measures a force required to push out the cut plastic products or packs of cut plastic products.

9. Process according to claim 3 further comprising:

g') performing, with a quality control device with an integrated pressure sensor, a quality test by measuring an underpressure required to separate the cut plastic products or packs of cut plastic products.

10. Process according to claim 3 further comprising:

g") performing a quality test by measuring a pulling force required to separate the cut plastic products or packs of the cut plastic products.

* * * * *